United States Patent
Fischer et al.

(10) Patent No.: US 10,425,528 B2
(45) Date of Patent: *Sep. 24, 2019

(54) STANDARD MOBILE COMMUNICATION DEVICE DISTRACTION PREVENTION AND SAFETY PROTOCOLS

(71) Applicant: Cell Command, Inc., Marietta, GA (US)

(72) Inventors: John J. Fischer, Marietta, GA (US); Hap Nguyen, Seal Beach, CA (US)

(73) Assignee: CELL COMMAND, INC., Marietta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/210,586

(22) Filed: Dec. 5, 2018

(65) Prior Publication Data

US 2019/0132442 A1 May 2, 2019

Related U.S. Application Data

(63) Continuation of application No. 15/677,081, filed on Aug. 15, 2017, now Pat. No. 10,194,018, which is a (Continued)

(51) Int. Cl.
*H04M 1/725* (2006.01)
*H04W 4/021* (2018.01)
(Continued)

(52) U.S. Cl.
CPC ..... *H04M 1/72577* (2013.01); *G07C 9/00119* (2013.01); *G08G 1/017* (2013.01);
(Continued)

(58) Field of Classification Search
CPC .................. H04M 1/72577; H04M 1/72569
(Continued)

(56) References Cited

U.S. PATENT DOCUMENTS 3,870,120 A    3/1975   Blinkilde
4,142,601 A    3/1979   Ochiai
(Continued)

FOREIGN PATENT DOCUMENTS

CN       1458802 A     11/2003
JP     H10138791 A      5/1998
(Continued)

OTHER PUBLICATIONS

Translated Summary of Office Action for Chinese Patent Application No. 201510605356.2, dated Feb. 19, 2019, 7 pages.
(Continued)

*Primary Examiner* — John J Lee
(74) *Attorney, Agent, or Firm* — Withrow & Terranova, PLLC

(57) ABSTRACT

Methods and systems for providing standardized mobile device distraction prevention and safety protocols are disclosed. In particular, an embodiment of a method for activating a distraction prevention or safety protocol behavior in a mobile device when the mobile device satisfies a specific condition is disclosed. The method includes discovering one or more protocol activators configured to transmit discovery information associated with a specific condition. The method further includes activating distraction prevention safety protocol behavior in the mobile device based at least in part on the discovery information. In an implementation, the specific condition may be a specified environment itself and or include an event when the mobile device enters a specified environment or a specified sequence of numbers is dialed from the mobile device.

20 Claims, 10 Drawing Sheets

Related U.S. Application Data continuation of application No. 15/368,856, filed on Dec. 5, 2016, now Pat. No. 9,756,175, which is a continuation of application No. 15/075,327, filed on Mar. 21, 2016, now Pat. No. 9,584,652, which is a continuation of application No. 12/883,583, filed on Sep. 16, 2010, now Pat. No. 9,294,603, which is a continuation-in-part of application No. 12/585,503, filed on Sep. 16, 2009, now abandoned.

(60) Provisional application No. 61/343,490, filed on Apr. 29, 2010, provisional application No. 61/284,635, filed on Dec. 21, 2009, provisional application No. 61/283,286, filed on Dec. 2, 2009, provisional application No. 61/277,664, filed on Sep. 28, 2009, provisional application No. 61/277,156, filed on Sep. 21, 2009.

(51) Int. Cl.
| | |
|---|---|
| *H04W 4/06* | (2009.01) |
| *H04W 48/16* | (2009.01) |
| *G07C 9/00* | (2006.01) |
| *G08G 1/017* | (2006.01) |
| *H04M 1/60* | (2006.01) |
| *H04M 1/67* | (2006.01) |
| *H04W 4/80* | (2018.01) |
| *H04W 88/02* | (2009.01) |

(52) U.S. Cl.
CPC ........... *H04M 1/6075* (2013.01); *H04M 1/67* (2013.01); *H04M 1/72569* (2013.01); *H04W 4/021* (2013.01); *H04W 4/06* (2013.01); *H04W 4/80* (2018.02); *H04W 48/16* (2013.01); *G07C 9/00674* (2013.01); *G07C 2009/00793* (2013.01); *H04M 1/7253* (2013.01); *H04M 2250/02* (2013.01); *H04W 88/02* (2013.01)

(58) Field of Classification Search
USPC .......... 455/418, 67.11, 419, 515, 434, 552.1, 455/420, 550.1
See application file for complete search history.

(56) References Cited

U.S. PATENT DOCUMENTS

| | | | |
|---|---|---|---|
| 5,148,153 A | 9/1992 | Haymond | |
| 5,335,748 A | 8/1994 | Wilson | |
| 5,815,407 A | 9/1998 | Huffman et al. | |
| 5,862,470 A | 1/1999 | Damghani | |
| 6,011,973 A | 1/2000 | Valentine et al. | |
| 6,122,486 A | 9/2000 | Tanaka et al. | |
| 6,233,448 B1 | 5/2001 | Alperovich et al. | |
| 6,256,558 B1 | 7/2001 | Sugiura et al. | |
| 6,429,768 B1 | 8/2002 | Flick | |
| 6,489,889 B1 | 12/2002 | Smith | |
| 6,687,497 B1 | 2/2004 | Parvulescu et al. | |
| 6,690,940 B1 | 2/2004 | Brown et al. | |
| 6,721,542 B1 | 4/2004 | Anttila et al. | |
| 6,771,946 B1 | 8/2004 | Oyaski | |
| 6,771,955 B2 * | 8/2004 | Imura | H04W 88/02 455/420 |
| 6,782,266 B2 | 8/2004 | Baer et al. | |
| 6,970,724 B2 | 11/2005 | Leung | |
| 6,973,333 B1 | 12/2005 | O'Neil | |
| 7,027,621 B1 | 4/2006 | Prokoski | |
| 7,064,656 B2 | 6/2006 | Belcher et al. | |
| 7,123,874 B1 | 10/2006 | Brennan | |
| 7,181,229 B2 | 2/2007 | Singh et al. | |
| 7,236,776 B2 | 6/2007 | Nath et al. | |
| 7,260,390 B1 | 8/2007 | Skinner et al. | |
| 7,343,148 B1 | 3/2008 | O'Neil | |
| 7,477,135 B2 | 1/2009 | Belcher et al. | |
| 7,511,833 B2 | 3/2009 | Breed | |
| 7,711,355 B1 | 5/2010 | Krüger et al. | |
| 7,729,689 B2 | 6/2010 | Chakraborty et al. | |
| 7,769,689 B2 | 8/2010 | Monk | |
| 3,044,794 A1 | 10/2011 | Chauncey et al. | |
| 8,175,642 B2 | 5/2012 | Shah | |
| 9,294,603 B2 | 3/2016 | Fischer et al. | |
| 9,584,652 B2 | 2/2017 | Fischer et al. | |
| 9,756,175 B2 | 9/2017 | Fischer et al. | |
| 2002/0039896 A1 | 4/2002 | Brown | |
| 2003/0114152 A1 | 6/2003 | Gibbs et al. | |
| 2004/0077339 A1 | 4/2004 | Martens | |
| 2004/0198306 A1 | 10/2004 | Singh et al. | |
| 2004/0209594 A1 | 10/2004 | Naboulsi | |
| 2004/0228460 A1 | 11/2004 | Keramane | |
| 2004/0253963 A1 * | 12/2004 | Park | H04M 3/436 455/456.2 |
| 2006/0131468 A1 | 6/2006 | Roncarelli | |
| 2006/0212195 A1 | 9/2006 | Veith et al. | |
| 2007/0032225 A1 * | 2/2007 | Konicek | H04M 1/72513 455/417 |
| 2007/0035384 A1 | 2/2007 | Belcher et al. | |
| 2007/0101426 A1 | 5/2007 | Lee et al. | |
| 2007/0120948 A1 | 5/2007 | Fujioka et al. | |
| 2008/0009296 A1 | 1/2008 | Han | |
| 2008/0014966 A1 * | 1/2008 | Chakraborty | H04M 1/7253 455/456.4 |
| 2008/0133791 A1 | 6/2008 | Hodges et al. | |
| 2008/0161034 A1 | 7/2008 | Akiyama | |
| 2008/0194292 A1 | 8/2008 | Naito et al. | |
| 2008/0223645 A1 | 9/2008 | Shaw | |
| 2008/0296883 A1 | 12/2008 | Burkhardtsmaier | |
| 2008/0305735 A1 | 12/2008 | Farnsworth et al. | |
| 2009/0029675 A1 | 1/2009 | Steinmetz et al. | |
| 2009/0325566 A1 | 12/2009 | Bell et al. | |
| 2010/0087137 A1 | 4/2010 | Fischer et al. | |
| 2011/0009107 A1 | 1/2011 | Guba et al. | |
| 2011/0063098 A1 | 3/2011 | Fischer et al. | |
| 2011/0294520 A1 | 12/2011 | Zhou et al. | |
| 2012/0220213 A1 | 8/2012 | Fischer et al. | |
| 2016/0205239 A1 | 7/2016 | Fischer et al. | |
| 2017/0085702 A1 | 3/2017 | Fischer et al. | |

FOREIGN PATENT DOCUMENTS

| | | |
|---|---|---|
| JP | H10200469 A | 7/1998 |
| JP | 2000333253 A | 11/2000 |
| JP | 2001119451 A | 4/2001 |
| JP | 2003102058 A | 4/2003 |
| JP | 2004349935 A | 12/2004 |
| JP | 2005236655 A | 9/2005 |
| JP | 2005531236 A | 10/2005 |
| JP | 2008507893 A | 3/2008 |
| JP | 2010512127 A | 4/2010 |
| JP | 2013504967 A | 2/2013 |
| KR | 10-0277333 B1 | 2/2001 |
| KR | 20020088933 A | 11/2002 |
| KR | 10-20030024310 A | 3/2003 |
| KR | 10-20050057896 A | 6/2005 |
| WO | 03028342 A2 | 4/2003 |
| WO | 2006019378 A1 | 2/2006 |
| WO | 2006117843 A1 | 11/2006 |
| WO | 2011002319 A2 | 1/2011 |
| WO | 2011033365 A2 | 3/2011 |

OTHER PUBLICATIONS

Inami, Masaaki, et al., "Wired Extension Methods for Bluetooth Networks," Technical Report of the Institute of Electronics, vol. 103, Issue 415, Nov. 7, 2003, Information and Communication Engineers, pp. 47-52.

Misonoo, Kaoru, et al., "A Study on Data-Communications Method with Scatternet," The 22nd Conference of the Japan Society for Simulation Technology, Jun. 18, 2003, Japan Society for Simulation Technology, pp. 51-54.

(56) References Cited

OTHER PUBLICATIONS

Non-Final Office Action for U.S. Appl. No. 12/883,583, dated May 28, 2013, 12 pages.
Final Office Action for U.S. Appl. No. 12/883,583, dated Jan. 16, 2014, 18 pages.
Non-Final Office Action for U.S. Appl. No. 12/883,583, dated Aug. 1, 2014, 28 pages.
Notice of Allowance for U.S. Appl. No. 12/883,583, dated Aug. 3, 2015, 8 pages.
Notice of Allowance for U.S. Appl. No. 12/883,583, dated Nov. 16, 2015, 8 pages.
Notice of Allowance for U.S. Appl. No. 12/883,583, dated Feb. 1, 2016, 8 pages.
Non-Final Rejection for U.S. Appl. No. 12/585,503, dated May 24, 2012, 10 pages.
Final Office Action for U.S. Appl. No. 12/585,503, dated Oct. 12, 2012, 14 pages.
Non-Final Office Action for U.S. Appl. No. 12/585,503, dated Apr. 22, 2013, 13 pages.
Non-Final Office Action for U.S. Appl. No. 13/469,965, dated Aug. 20, 2012, 8 pages.
Final Office Action for U.S. Appl. No. 13/469,965, dated Jan. 14, 2013, 9 pages.
International Search Report and Written Opinion for International Patent Application No. PCT/IB2010/002319, dated Jul. 29, 2011, 8 pages.
International Preliminary Report on Patentability for International Patent Application No. PCT/IB2010/002319, completed on Jan. 31, 2012, 6 pages.
Second Office Action for Chinese Patent Application No. 201080040674.4, dated Apr. 2, 2014, 15 pages.
Third Office Action for Chinese Patent Application No. 201080040674.4, dated Oct. 22, 2014, 14 pages.
Extended European Search Report for European Patent Application No. 10816765.1, dated Apr. 22, 2013, 7 pages.
Office Action for European Patent Application No. 10816765.1, dated Feb. 7, 2014, 6 pages.
Office Action for European Patent Application No. 10816765.1, dated Sep. 8, 2015, 7 pages.
Notice of Rejection for Japanese Patent Application No. 2012-529352, dated Sep. 2, 2014, 15 pages.
Notice of Allowance for Japanese Patent Application No. 2012-529352, dated Jun. 2, 2015, 4 pages.
Notice to Submit Response for Korean Patent Application No. 10-2012-7009531, dated Oct. 26, 2015, 6 pages.
Notice of Allowance for Korean Patent Application No. 10-2012-7009531, dated Feb. 26, 2016, 7 pages.
First Office Action No. 48067, dated 2013, for Mexican Patent Application No. MX/a/2012/003124, 3 pages.
Second Office Action No. 6546, dated Jan. 24, 2014, for Mexican Patent Application No. MX/a/2012/003124, 5 pages.
Office Action for Vietnamese Patent Application No. 1-2012-00935, dated Sep. 25, 2015, 3 pages.
Patent Examination Report No. 1 for Australian Patent Application No. 2009300361, dated Aug. 23, 2013, 4 pages.
Office Action for Chinese Patent Application No. 200980148512.X, dated Jun. 4, 2013, 7 pages.
Examination Report for British Patent Application No. 11050465, dated Sep. 4, 2013, 3 pages.
International Search Report and Written Opinion for International Patent Application No. PCT/US2009/005292, dated Mar. 24, 2010, 7 pages.
International Preliminary Report on Patentability for International Patent Application No. PCT/US2009/005292, dated Apr. 5, 2011, 5 pages.
Substantive Examination for Malaysian Patent Application No. PI 2012001214, dated Mar. 31, 2016, 3 pages.
Subsequent Substantive Examination Report for Philippine Patent Application No. 1/2012/500505, received May 6, 2016, 2 pages.
Substantive Examination Report for Philippine Patent Application No. 1/2012/500505, dated Jan. 24, 2014, 1 page.
Decision on Formality Acceptance for Vietnamese Patent Application No. 1-2012-00935, dated Aug. 30, 2012, 2 pages.
Non-Final Office Action for U.S. Appl. No. 15/075,327, dated Apr. 18, 2016, 7 pages.
Notice of Allowance for U.S. Appl. No. 15/075,327, dated Aug. 22, 2016, 7 pages.
Office Action and Examination Search Report for Canadian Patent Application No. 2774225, dated Dec. 9, 2016, 6 pages.
Notice of Rejection for Japanese Patent Application No. 2015-153155, dated Sep. 20, 2016, 6 pages.
Notice of Allowance for Vietnamese Patent Application No. 1-2012-00935, dated Dec. 8, 2016, 2 pages.
Non-Final Office Action for U.S. Appl. No. 15/368,856, dated Jan. 3, 2017, 7 pages.
Notice of Allowance for U.S. Appl. No. 15/368,856, dated May 1, 2017, 9 pages.
Notice of Allowance for Japanese Patent Application No. 2015-153155, dated Jan. 17, 2017, 4 pages.
First Examination Report for Indian Patent Application No. 3228/CHENP/2012, dated Jul. 26, 2018, 5 pages.
Non-Final Office Action for U.S. Appl. No. 15/677,081, dated Nov. 16, 2017, 7 pages.
Final Office Action for U.S. Appl. No. 15/677,081, dated May 31, 2018, 7 pages.
Notice of Allowance for U.S. Appl. No. 15/677,081, dated Sep. 12, 2018, 9 pages.
First Office Action for Chinese Patent Application No. 201510605356.2, dated Mar. 5, 2018, 11 pages.

* cited by examiner

STANDARD MOBILE COMMUNICATION DEVICE DISTRACTION PREVENTION AND SAFETY PROTOCOLS

PRIORITY APPLICATIONS

This application is a continuation application of and claims priority to U.S. patent application Ser. No. 15/677,081 filed on Aug. 15, 2017, now issued as U.S. Pat. No. 10,194,018, which is a continuation application of and claims priority to U.S. patent application Ser. No. 15/368,856 filed on Dec. 5, 2016, now issued as U.S. Pat. No. 9,756,175, which is a continuation application of and claims priority to U.S. patent application Ser. No. 15/075,327 filed on Mar. 21, 2016, now issued as U.S. Pat. No. 9,584,652, which is a continuation application of and claims priority to U.S. patent application Ser. No. 12/883,583 filed on Sep. 16, 2010, now issued as U.S. Pat. No. 9,294,603, which is a continuation-in-part application of and claims priority to U.S. patent application Ser. No. 12/585,503 filed on Sep. 16, 2009, now abandoned, all of which are incorporated herein by reference in their entireties.

U.S. patent application Ser. No. 12/883,583 filed on Sep. 16, 2010, now issued as U.S. Pat. No. 9,294,603, also claims priority to U.S. Provisional Patent Application Ser. No. 61/343,490 filed Apr. 29, 2010, U.S. Provisional Patent Application Ser. No. 61/284,635 filed Dec. 21, 2009, U.S. Provisional Patent Application Ser. No. 61/283,286 filed Dec. 2, 2009, U.S. Provisional Patent Application Ser. No. 61/277,664 filed Sep. 28, 2009, and U.S. Provisional Patent Application Ser. No. 61/277,156 filed Sep. 21, 2009, all of which are incorporated herein by reference in their entireties.

FIELD OF INVENTION

The present invention generally relates to standard cellular/mobile device distraction prevention and safety protocols. In particular, the present invention relates to the development and standardization of mobile device protocols and protocol sensors to control functionalities of a mobile communication device (also known and referred to as mobile device, cell phone, smart phone, mobile phone, skype phone, satellite phone, laptop, net book, net pad, etc.) when the mobile device satisfies a specific condition, such as, entering a specified environment or location or area, etc. containing a protocol enabled sensor.

BACKGROUND

Over the past few decades, the cellular/wireless industry has advanced by leaps and bounds. Throughout the world, mobile devices have become a ubiquitous part of everyday life. The enormous proliferation of the mobile device is nothing short of incredible. But, with it has surfaced a host of major problems much to the detriment of society. Every technical advancement and development has certain associated challenges and the cell phone is no exception. Many inherent life threatening problems are gaining light speed momentum. Such problems include increased accidents from driver distraction due to mobile devices, increased disruption and cheating in the classroom, increased contraband, gang activity, and death threats from inside the prison system etc. These problems come with a magnificent cost. For example, the World Health Organization (WHO) estimates that distracted driving alone costs developed countries between one and three percent of GDP.

A few mobile application attempts have been made to solve the problem behind the wheel and some cell frequency jamming attempts have been tried in various prison systems. Such solutions, however, face impenetrable obstacles such as: current law in various countries, uninstalling the application, turning off the Bluetooth, Bluetooth pairing requirements, GPS latency and signal lapses, large number of varied mobile platforms, continuous updating, closed platforms, battery drain, and the inability to affect Skype™ and satellite phones which prisoners easily obtain.

The most significant obstacle facing all solution providers is the lack of universal standards within the mobile device industry. Currently, the mobile device manufacturers have no universal platform for developing standard safety technologies. Since there are no standards, even a simple safety feature cannot be universally applied across all mobile devices. And since safety is a global concern, a solution which can only be applied to select mobile devices is not preferred. In order to combat these societal problems, there exists a well felt need to design and implement universal distraction prevention and safety technologies for all mobile communication devices.

Because there are hundreds of different cell phone makes and models combined with open, closed & partially closed configurations, developing a single simple comprehensive solution for all mobile phone architectures is considered impossible. Notwithstanding such impediments, the task to effectively implement safety standards and methods to prevent cellular distractions to benefit society must be carried out in a timely and undisruptive manner.

In addition, other current obstacles include but are not limited to quick detection and connectionless non-pairing communication with Bluetooth devices, deterioration of cellular battery life, quick and easy application disablement.

Moreover, existing systems and methods only provide a partial solution for a single environment. For example, jamming in prisons which is illegal in many countries prohibits emergency calling and is therefore undesirable for schools and hospitals and such. Art to provide solutions for distracted driving requires some form of pairing which makes an automatic universal application impossible. The pairing dilemma in essence makes each mobile device car specific. For example, even if such a system is installed on a teen's car, should the teen drive the parent's car or sibling's car or friend's car, the mobile application will not work unless an entirely new pairing is involved for that specific car. It also creates the problem requiring a new software upload for each system change or system upgrade to correspond to the changed system. Such a system leaves parents and employers frustrated as the system no longer works properly. Also, parents and employers won't have any available working system if they happen to purchase a phone with a closed architecture thereby preventing system functionality inhibition.

There is, therefore, a need for a simple, cost effective improvement to mobile communication technologies to adopt and implement a standardized set of safety protocols such that new safety enhancement systems and methods to prevent mobile distractions can easily be engineered and adopted for all new and existing mobile phones. There is also a need for a simple, cost effective improvement to Bluetooth technology devices to apply a universal set of address codes to work in tandem with the mobile device embedded distraction prevention protocols.

SUMMARY OF INVENTION

It is, therefore an object of the present invention, to provide a set of standard mobile communication device distraction prevention and safety protocols to be embedded in the mobile device firmware (system memory or system image) and to provide various applicable sensors to be adopted universally throughout the mobile communications industry for providing safety enhancement systems and methods to prevent mobile device distractions.

It is a further object of the present invention to provide a new and useful set of standard Bluetooth address codes to work in conjunction with protocol enabled mobile devices and facilitate communication with the proposed mobile distraction prevention protocols.

It is yet another object of the present invention to provide a safety enforcement system that produces a signal visible outside a vehicle whenever the driver is operating the vehicle in an unsafe or unlawful manner.

It is also an object of the present invention, to provide a set of mobile device safety protocols to be embedded in the mobile device firmware for the purpose of simple uniform adoption of future safety enhancements.

Methods and systems for providing standard mobile communication device safety and distraction prevention protocols are disclosed. In an embodiment, a method for activating a distraction prevention safety protocol behavior in a mobile device when the mobile device satisfies a specific condition is disclosed. The method includes discovering at least one protocol activators configured to transmit discovery information associated with the specific condition. The method further includes activating safety protocol behavior in the mobile device based at least in part on the discovery information. In an implementation, the specific condition corresponds to at least one of two events being when the mobile device enters a specified environment and when the mobile device enters or a specified sequence of numbers is dialed from the mobile device.

A method of controlling functionality of a mobile device within a specified environment is disclosed. In an implementation, the method includes broadcasting a trigger signal within the specified environment and determining discovery information associated with the trigger signal and the specified environment. The method further includes implementing a set of protocol instructional behaviors in the mobile device based at least in part on the discovery information and the specified environment. Such an implementation of the set of protocol instructional behavior results in a restricted functionality of the mobile device.

A system for implementing safety protocols in a mobile device is disclosed. According to an embodiment, the system includes a call authorization module configured to execute a protocol behavior in the mobile device based at least in part on discovery information. The discovery information is transmitted by one or more sensors in the specified environment and corresponds to a specified environment in which the mobile device operates.

A method for controlling behavior of a mobile device inside a transportation vehicle is disclosed. According to an implementation, the method includes activating a sensor configured to broadcast a trigger signal within a pre-determined limited range inside the vehicle. The method further includes implementing a protocol behavior in the mobile device based at least in part on the trigger signal. The activation of the sensor is based on a state or a position of one or more vehicular components and/or a tilt switch mechanism configured to determine vehicular movement.

A vehicle occupant safety system is disclosed. In an implementation, the system includes a smart phone comprising a first computing system for signal processing and a trigger signal emitter for use by a passenger of a vehicle. The trigger signal emitter is in communication with a second computing system when the passenger is inside the vehicle. The second computing system is configured to control operational functions of the vehicle. The system further includes a processing logic associated with the second computing system for determining when the vehicle concluded operation and for detecting a signal from the trigger signal emitter. The detection occurs in such a manner that the second computing system is activated to send a distress signal when the passenger has remained inside the vehicle for a predetermined time subsequent to concluded operation of the vehicle.

A system for enforcement of safety protocols is disclosed. In an implementation, the system includes a mobile device configured to communicate with at least one vehicular component inside a transportation vehicle to determine an unsafe driving based on safety protocols configured in the mobile device. The system further includes an exterior vehicle warning signal indicator (WSI) configured to issue visible warning signals based on the determination by the mobile device.

A system for implementing mobile safety protocols is disclosed. In an embodiment, the system includes a self-powered Bluetooth sensor assembly configured to transmit discovery information without an external power supply. The system further includes a mobile device configured to determine and implement a safety protocol behavior based on the discovery information. The discovery information corresponds to a name of the self-powered Bluetooth sensor and a class of a specified environment in which the self-powered Bluetooth sensor operates.

To the accomplishment of the above and related objects, this invention may be embodied in the form illustrated in the accompanying drawings, attention being called to the fact, however, that the drawings are illustrative only, and that changes may be made in the specific construction illustrated.

BRIEF DESCRIPTION OF FIGURES

To further clarify the above and other advantages and features of the present invention, a more particular description of the invention will be rendered with reference to specific embodiments thereof, which are illustrated in the appended drawings. It is appreciated that these drawings depict only typical embodiments of the invention and are therefore not to be considered limiting of its scope. The invention will be described and explained with additional specificity and detail with the accompanying drawings in which.

DETAILED DESCRIPTION OF DRAWINGS

As described earlier, numerous benefits that a mobile device offers coexist with certain life threatening problems like accidents due to driver distraction, security breach in prisons, cheating in classrooms, etc. Conventional solutions have proved to be unsatisfactory due to lack of universality, simplicity, and cost effectiveness. The biggest challenge faced in the mobile industry today is the lack of a standard platform for development of safety protocols that can be implemented across mobile devices from different manufacturers.

To this end, standard safety methods and systems are proposed for activating a safety protocol behavior in a mobile device when the mobile device satisfies a specific condition. In an embodiment, the method includes discovering at least one protocol activators configured to transmit discovery information associated with the specific condition. The method further includes activating safety protocol behavior in the mobile device based at least in part on the discovery information. In an implementation, the specific condition corresponds to at least one of two events being when the mobile device enters a specified environment and when the mobile device enters or a specified sequence of numbers is dialed from the mobile device.

The disclosed safety protocol behavior permits emergency calls to one or more pre-determined or programmable numbers. For example, in any case of specified environment, the safety protocols allow calls to be made to special numbers during emergency, such as, "911" in U.S., "112" in India, etc. Such special numbers can be preprogrammed and included as exceptions to any protocol instructional behavior.

Figure 1:
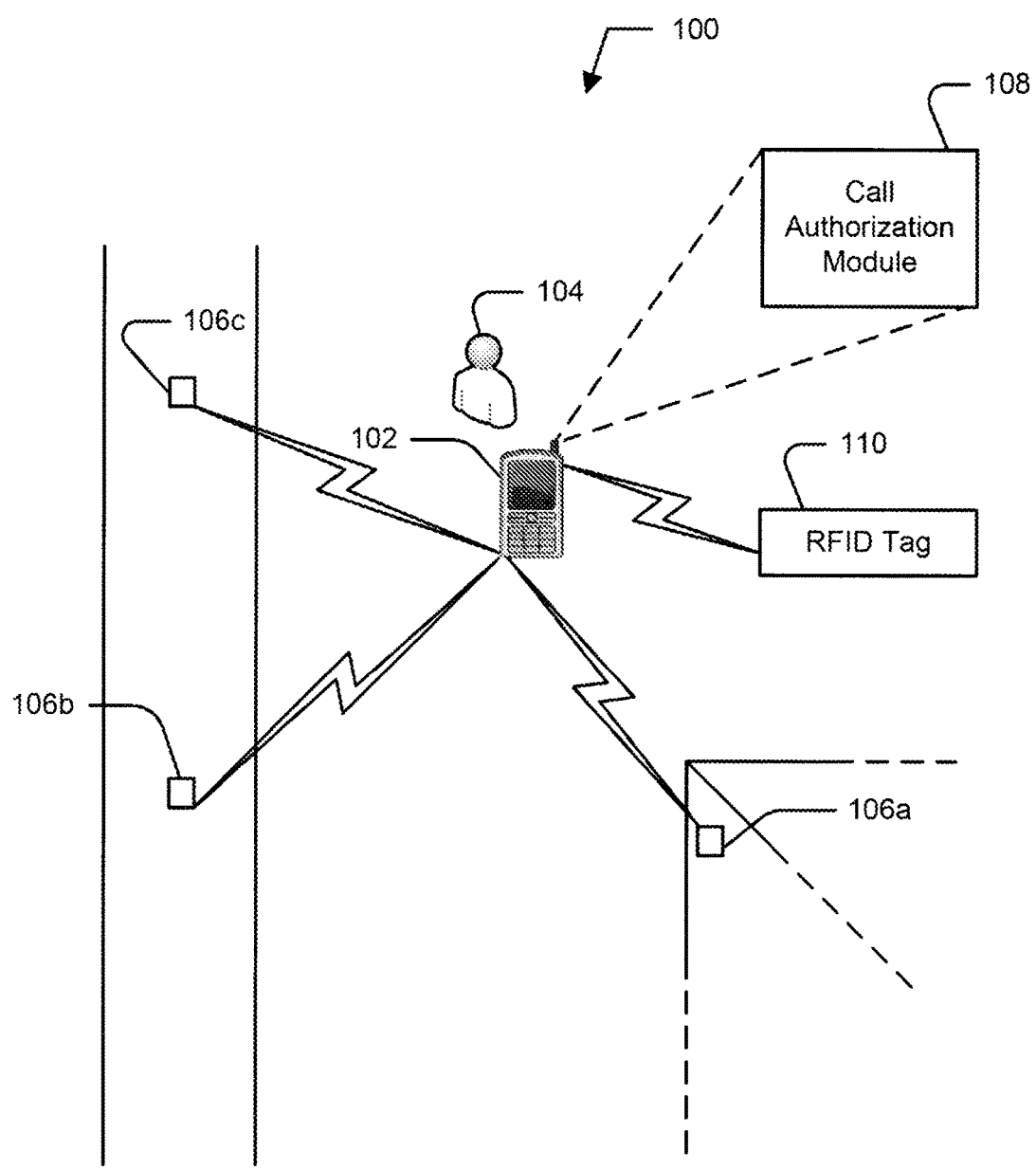
FIG. 1 illustrates a system for providing standard mobile device safety protocols according to an embodiment.

FIG. 1 illustrates a system 100 for providing standard cellular safety protocols according to an embodiment. As shown, the system 100 includes a mobile device 102 that implements the safety protocol(s) when the mobile device satisfies specific condition(s). Throughout the text, the term "mobile device" can refer to cellular phone, smart phone, cell phone, wireless phone or other similar devices offering capabilities of calling, text messaging, etc. using wireless medium via a communication network. In addition, for purposes of the ongoing description, the mobile device 102 corresponds to a communication device with inbuilt capabilities for sending and receiving signals in addition to the device's talk/text frequency band. Capable methods include but are not limited to NFC, Bluetooth, WiFi, Satellite, Skype, RFID, ZigBee, EdOcean, TransferJet, Ultra Wideband (UWB), Wireless USB, DSRC, IrDAa, and Wireless Personal Area Network (WPAN) etc. For example, the mobile device 102 can be Bluetooth enabled capable of Bluetooth transmission and reception.

In an embodiment, the specific conditions include event such as, the mobile device 102 entering a specified environment or dialing a specific sequence of numbers from the mobile device, etc.

The specific conditions may also correspond to events such as, but not limited to, an unlawful or unsafe operation of vehicle, an accident, a fight, deployment of an airbag in a vehicle, or other conditions that need immediate or timely attention. The proposed standard mobile device safety protocols can be so implemented that any set of specific conditions can be included by the standard approving body. Although, only a few cases of specific conditions have been disclosed, it may be appreciated that the proposed systems and methods for implementing mobile device safety protocols allow for future modification and/or update of the set of specific conditions to accommodate future needs of the society and law enforcement agencies.

The specified environment includes a transportation vehicle, a school, a class room, a correctional facility, an airport, an airplane, a court room, a hospital, a church, a theatre, a fly zone, a danger zone, an auditorium, a room in a house or any other environment for which disabling operational functions on a mobile device may be desired.

In an exemplary scenario for a safety protocol implementation, a user 104 carries the mobile device 102 and enters a specified environment such as a prison, or a hospital (thereby satisfies the specific condition). The system 100 includes one or more protocol activators (or "sensors") 106 (e.g. 106a, 106b, and 106c) installed at various locations in the specified environment. In an embodiment, the one or more protocol activators 106 correspond to one or more sensors capable of transmitting and receiving signals pertaining to technologies such as, but not limited to, a Bluetooth sensor, Radio Frequency Identification (RFID) tag reader, a EdOcean sensor, a TransferJet sensor, an Ultra Wideband sensor, a UWB, a Wireless USB, a DSRC sensor, an IrDAa sensor, Wireless Fidelity (WiFi) sensor, a Zigbee sensor, a Near Field Communication (NFC) sensor, and a Wireless Personal Area Network (WPAN) sensor, etc. It may be appreciated that the mobile device 102 is pre-equipped with such safety and distraction prevention protocols and in various embodiments, supports a communication between the mobile device 102 and the protocol activators 106 within a pre-determined communication range. In addition, the protocol activators 106 are characterized by a pre-determined device name or class or address, etc. associated with the specified environment.

The mobile device 102 includes a Call Authorization Module (CAM) (also referred to as software instructions, mobile application, etc.) 108 that coordinates the activation of the safety protocols in the mobile device 102. In the exemplary implementation, the protocol activators 106 transmit discovery information (sending a trigger signal) associated with the specified environment. The discovery information may include device name or class, or address associated with the protocol activators 106. The class of the protocol activators 106 provides information about the specified environment. The call authorization module 108 discovers (or receives the discovery information or trigger signal from) the protocol activators 106 as soon as the mobile device 102 enters the communication range of the protocol activators 106. In an alternative embodiment, the call authorization module 108 may instruct the mobile device 102 to transmit one or more request signals to obtain additional discovery information in cases where the protocol activators 106 correspond to passive sensors.

The CAM 108 determines distraction prevention safety protocol behavior(s) corresponding to the discovery information and activates the safety protocol behavior in the mobile device 102. Safety protocol behavior can correspond to enabling or disabling partially or wholly one or more functionalities associated with the mobile device 102. Such functionalities may include existing calling function, text function, a switching "on" or "off" function, a silent operation mode, etc. Safety protocol behavior may also correspond to a special mode of operation of the mobile device 102 in which the mobile device 102 is configured to automatically perform or not perform certain functions. Special mode of operation can correspond to a code of predetermined conduct associated with the specified environment or other special actions that the mobile device 102 performs automatically upon the onset of specific condition.

It may be desirable to implement safety protocol(s) in a manner that differentiates each user based on certain identification process or tagging. For instance, the user may wear an RFID tag 110 which enables the system 100 to identify the user as belonging to a particular working group. It may be appreciated that the user 104 of the mobile device 102 can correspond to different groups of people such as but not limited to an intruder, a guard, a driver, a thief or the like. In one of the implementations, the CAM 108 gathers additional information associated with specified working group in the specified environment. The working group may correspond to a designated group of people who will carry mobile devices that can be treated as exceptions to the safety protocol behavior. The system 100 allows the creation of such working groups who will have special privileges even when they carry mobile devices into the specified environment. For instance, a guard or official in a specified environment, such as, a prison may need to use a mobile device 102 under emergencies (in cases of prison riot, etc.). In such cases, the CAM 108, upon identification of the working group, may implement a safety protocol behavior corresponding to the class of the specified environment and the identified working group.

In an implementation, the protocol instructional behaviors implemented in the mobile device 102 permits emergency calls to one or more pre-determined or programmable numbers. For example, in any case of specified environment, the safety protocols allow calls to be made to special numbers during emergency, such as, "911" in U.S., "112" in India, etc. Such special numbers can be preprogrammed and included as exceptions to any protocol instructional behavior. In another example, the safety protocols can allow calls to a special number (parent's number) if the mobile device is carried by a child. The programming of such special numbers may be a feature that is provided by the mobile phone manufacturer or the service provider. The safety protocols can be so configured to accommodate such features.

Figure 2:
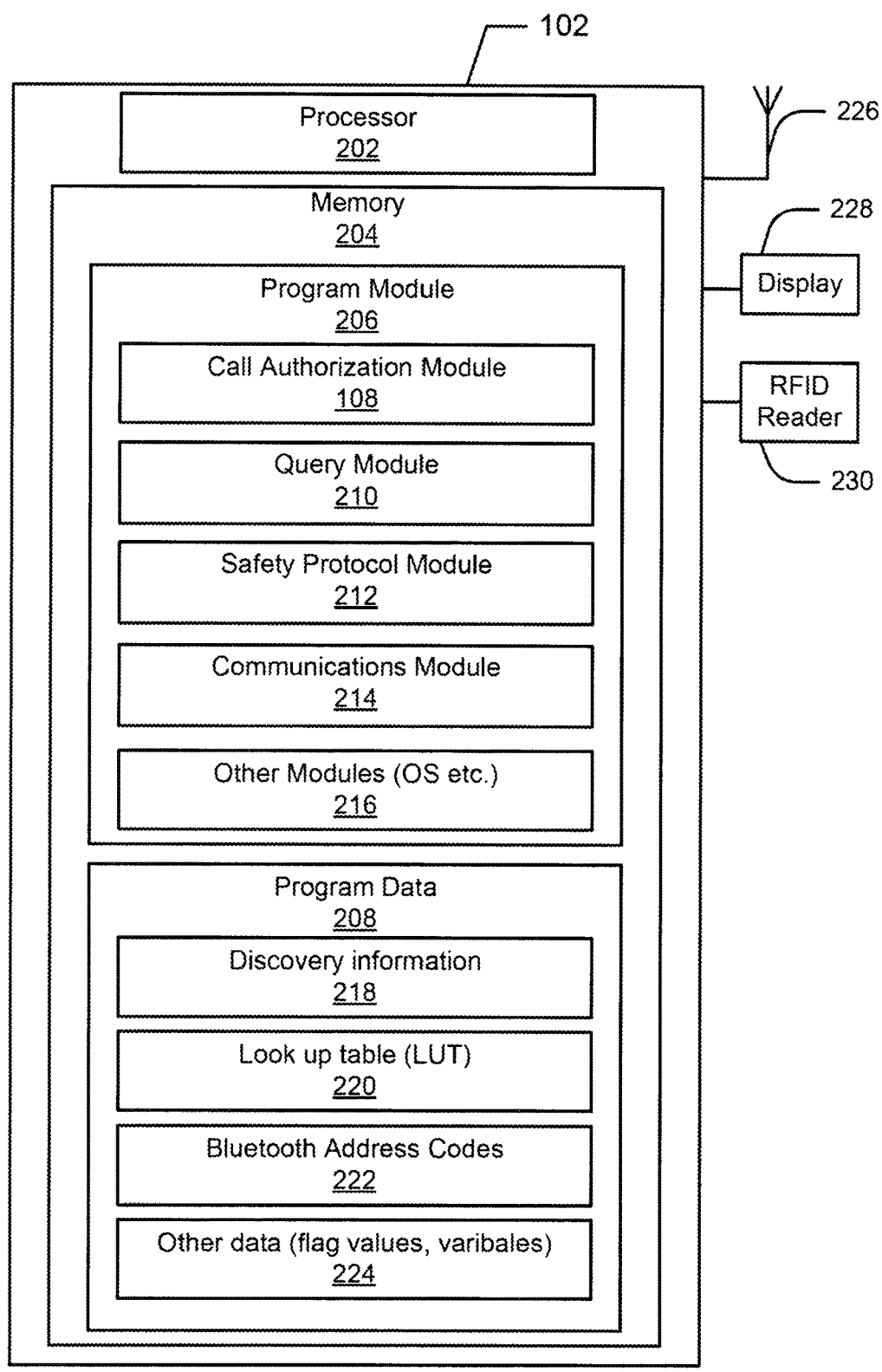
FIG. 2 illustrates a block diagram of a mobile device in accordance with an embodiment.

FIG. 2 illustrates a block diagram of a mobile device 102 in accordance with an embodiment. The mobile device 102 can correspond to any communication device, cellular phone, smart phone, personal digital assistant (PDA), mobile paging device, mobile gaming device, netbook, netpad, laptop, or computer that offers one or more capabilities to make/receive calls, send/receive text messages or electronic mails, play video games, etc. In a very basic configuration, mobile device 102 typically includes at least one processing unit 202 and system memory 204. Depending on the exact configuration and type of mobile device, system memory 204 may be volatile (such as RAM), non-volatile (such as ROM, flash memory, etc.), or some combination of the two. System memory 204 typically includes an operating system or system image; one or more program modules 206, and may include program data 208. The processor 202 accesses the memory 204 to execute instructions or applications stored as program modules 206 to perform one or more predetermined functions. The memory 204 stores associated data in program data 208.

The program module(s) 206 includes the call authorization module 108, query module 210, safety protocol module 212, communication module 214, and other modules 216. The program data 208 includes discovery information 218, look up tables (LUT) 220, Bluetooth address codes 222, other data (flag values, variables) 224. In addition, the mobile device 102 also includes an inbuilt antenna 226. It may be appreciated that the mobile device 102 may have various features available in all modern day mobile phones or smart phones. Only selected few of the features, functionalities, and modules have been disclosed that find relevance with respect to the ongoing description. For example, mobile device 102 may also have input device(s) such as keypad, stylus, or a pen, voice input device, touch input device, etc. Output device(s) such as a display 228, speakers, etc. may also be included. The display 228 may be a liquid crystal display, or any other type of display commonly used in mobile devices. The display 228 may be touch-sensitive, and would then act as an input device. The mobile device 102 also includes RFID reader 230 configured to detect and read RFID tags on employee badges worn by a user of the mobile device 102. Such devices are well known in the art and need not be discussed at length here.

The communication module 214 allows the mobile device 102 to communicate with other devices over a network. The communication module 214 is an example of a communication media. Communication media may typically be embodied by computer readable instructions, data structures, program modules, or other data in a modulated data signal, such as a carrier wave or other transport mechanism, and include any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, Bluetooth, Zigbee, Wi-Fi, Skype, Satellite and other wireless media. The term computer readable media as used herein includes both storage media and communication media.

One or more application programs may be loaded into memory 204 and run on the operating system stored in other modules 216. Examples of application programs include phone dialer programs, email programs, scheduling programs, PIM (personal information management) programs, word processing programs, spreadsheet programs, Internet browser programs, and so forth. The mobile device 102 also includes non-volatile storage (not shown) within the memory 204. The non-volatile storage may be used to store persistent information which should not be lost if the mobile device 102 is powered down/off. The applications may use and store information in the storage, such as e-mail or other messages used by an e-mail application, contact information used by a PIM, appointment information used by a scheduling program, documents used by a word processing program, and the like. The mobile device 102 includes a power supply (not shown), which may be implemented as one or more batteries. The power supply might further include an external power source, such as an AC adapter or a powered docking cradle that supplements or recharges the batteries.

The mobile device 102 may also include external notification mechanisms such as an LED and an audio interface. Such devices may be directly coupled to the power supply so that when activated, they remain on for a duration dictated by the notification mechanism even though the processor 202 and other components might shut down to conserve battery power. The LED may be programmed to remain on indefinitely until the user takes action to indicate the powered-on status of the device. The audio interface can be used to provide audible signals to and receive audible signals from the user. For example, the audio interface may be coupled to a speaker for providing audible output and to a microphone for receiving audible input, such as to facilitate a telephone conversation.

The communication module 214 performs the function of transmitting and receiving radio frequency communications. The communication module 214 facilitates wireless connectivity between the mobile device 102 and the outside world, via a communications carrier or service provider. Transmissions to and from the communications module 214 can be conducted under control of the operating system in other module 216. In other words, communications received by the communication module 214 may be disseminated to application programs via the operating system, and vice versa.

In operation, the call authorization module (CAM) 108 manages the implementation of safety protocol behavior when the mobile device 102 satisfies specific condition. For instance, whenever the mobile device 102 enters a specified environment, such as a prison, the call authorization module 108 instructs the communication module 214 to discover one or more sensors (or protocol activators) 106; deployed at various locations in the specified environment. The communication module 214 provides the mobile device 102 with communication capabilities with the one or more sensors 106 via Bluetooth transmission or RFID, WiFi, Zigbee, and Near Field transmissions depending on the type of sensors deployed. It may be noted that each of the one or more sensors 106 can be characterized by a Universally Unique Identifier (UUID), such as Media Access Control addresses in case of Bluetooth sensors. Alternatively, the one or more sensors 106 can be standardized to implement the safety protocols by assigning a specific code for a specified device name, device class, and device type.

As described earlier, the one or more sensors 106 are configured to transmit trigger signals in the specified environment. The communication module 214 receives such trigger signals and the discovery information transmitted by the one or more sensors 106. In an alternative embodiment, the query module 210 queries the one or more sensors 106 for discovery information. Such a querying comes handy in case of passive sensors 106. The discovery information corresponds to device name of the sensors and class information associated with the specified environment. The one or more sensors 106 broadcast the discovery information in the form of a set of alphanumeric characters. Each such set would correspond to a specified environment and a protocol behavior. Another case where such a query would be possible is when there are different working groups having different desirable behaviors associated with their mobile devices. In such cases, the query module 210 instructs RFID reader 230 to detect and read RFID tags on the employee badges of the people to determine working group. The discovery information is saved in discovery information 218 of program data 208.

Upon receipt of the discovery information, the call authorization module 108 is configured to determine a protocol behavior in the mobile device 102 based on the discovery information. In an embodiment, the discovery information may also include working group information in addition to the class of the specified environment. In operation, the CAM 108 instructs the safety protocol module 212 to determine a protocol behavior corresponding to the received discovery information.

Standard Mobile Communication Device Safety Protocols

Table 1 illustrates an exemplary representation of a set of standard mobile device safety and distraction prevention protocols. The working group may be standardized and included in the firmware of all mobile devices 102 from different manufacturers. The first column corresponds to a code, the second column corresponds to a working group, the third column refers to the contents corresponding to a given code, and forth column refers to the protocol behavior for the mobile device 102. Consider an example of a typical MAC address: UUID-11:A2:23:FE:40

As shown in the table, "11:A2" represents the working group, and depending upon the contents, corresponding protocol behavior can be selected.

TABLE 1

| Code | Working group | Contents | Meanings |
|---|---|---|---|
| 2 | 11:A2 | 11111111 | Tells the phone that it is located in a defined area of driver's seat. Functions will be inhibited |
| 3 | | 22222222 | Tells the phone the vehicle's transmission is not in park. Functions will be inhibited. |
| 4 | | 33333333 | Rings the phone a child is in danger. Sensor is attached to child. If a parents forgets and leaves a child in the vehicle, phone rings |
| 5 | | 44444444 | Tells the phone it is inside of a prison. Functions inhibited. |
| 6 | | 55555555 | Tells the phone of defined school zone area. Functions inhibited |
| 7 | | 66666666 | Tells the phone it is in a classroom. Functions inhibited |
| 8 | | 77777777 | Tells the phone it is in a Public Transit Vehicle driver's seat area. Functions inhibited. |
| 9 | | 88888888 | Tells the phone it is in corporate vehicle driver's seat area. Functions inhibited |
| 10 | | 99999999 | Tells the phone it is in a church or auditorium. Service disallowed during specified mass or prayer service time. |
| 11 | | 00000000 | Tells the phone it is in a court house. Service disallowed |
| 12 | | AAAAAAAA | Tells the phone it is in a movie theatre. Service disallowed during specified movie times. |

TABLE 1-continued

| Code | Working group | Contents | Meanings |
|---|---|---|---|
| 13 | | BBBBBBBB | Tells the phone bedtime/Parent wants off. Functions inhibited. |
| 14 | | CCCCCCCC | Airbag deployment. Tells phone to dial emergency number. |
| 15 | | DDDDDDDD | Reserved for future |

It is desired for the proposed protocols to be applied globally across all mobile devices, and for unregistered and incompatible phones to be removed from the system by making them inoperable or non-functional in the network. Accordingly, it is also desirable that all mobile device manufacturers implement software based on the suggested protocols. The state or law enforcement agencies could select which protocols to activate for all mobile devices entering their specific state. For example, if a device is activated in the state of California and the CAM 108 detects code "11111111," then the CAM 108 automatically searches for code "22222222," If both codes are discovered by the CAM 108, then the TEXTING and EMAILING functions of the mobile device can be inhibited in accordance with the safety protocols specified in Table 1.

It is also desirable that the specified environments where safety protocols need to be activated have one or more sensors or protocol activators 106 installed at prominent locations. Each such sensor also needs to be standardized as described earlier to be compatible with the safety protocols implemented in the mobile device 102. For instance, auto manufacturers, schools, court houses, prisons, public transit systems, hospitals, etc. can have one or more protocol activators 106 configured to transmit signals according to their suggested protocol and desired behavior in the mobile devices. Specified environments such as churches and theatres can have one or more sensors 106 configured to transmit according to time clocks for scheduled services and movies respectively. Parents could have a child's room sensor configured according to a time clock for scheduled bedtime which may be different on a night preceding a school day and a preceding a non-school night.

A typical scenario can be inhibited functions of the mobile device 102 in a prison or a class room where it may be desirable to disallow mobile device activity. Bluetooth sensors or other transmitters may be strategically placed within the environment preventing inmates and students from using their mobile devices. RFID tag embedded in employee badges for guards and teachers can permit usage of their phones in the respective specified environment.

In another embodiment, the system 100 can be used to ensure the safety of a passenger or a vehicle occupant other than the driver in a transportation vehicle. There may be cases when the vehicle occupant is a child or a physically handicapped or incapacitated person who might need attention and care all the time. In a case where the driver or the parent forgets a sleeping child in the vehicle and goes beyond an allowed distance from the vehicle, the safety protocols enable the system to notify the parent or the driver that the child is still inside the vehicle. As shown in table 1, when the CAM 108 interprets the contents as "33333333" then the parent of the child is notified by ringing the mobile device 102 carried by the parent. The cell phone rings and displays "Child left in Car" and prevents accidents to the sleeping child. A sensor (e.g. Bluetooth emitter) is attached to child that is in communication with the system.

Bluetooth Address Codes

Figure 3:
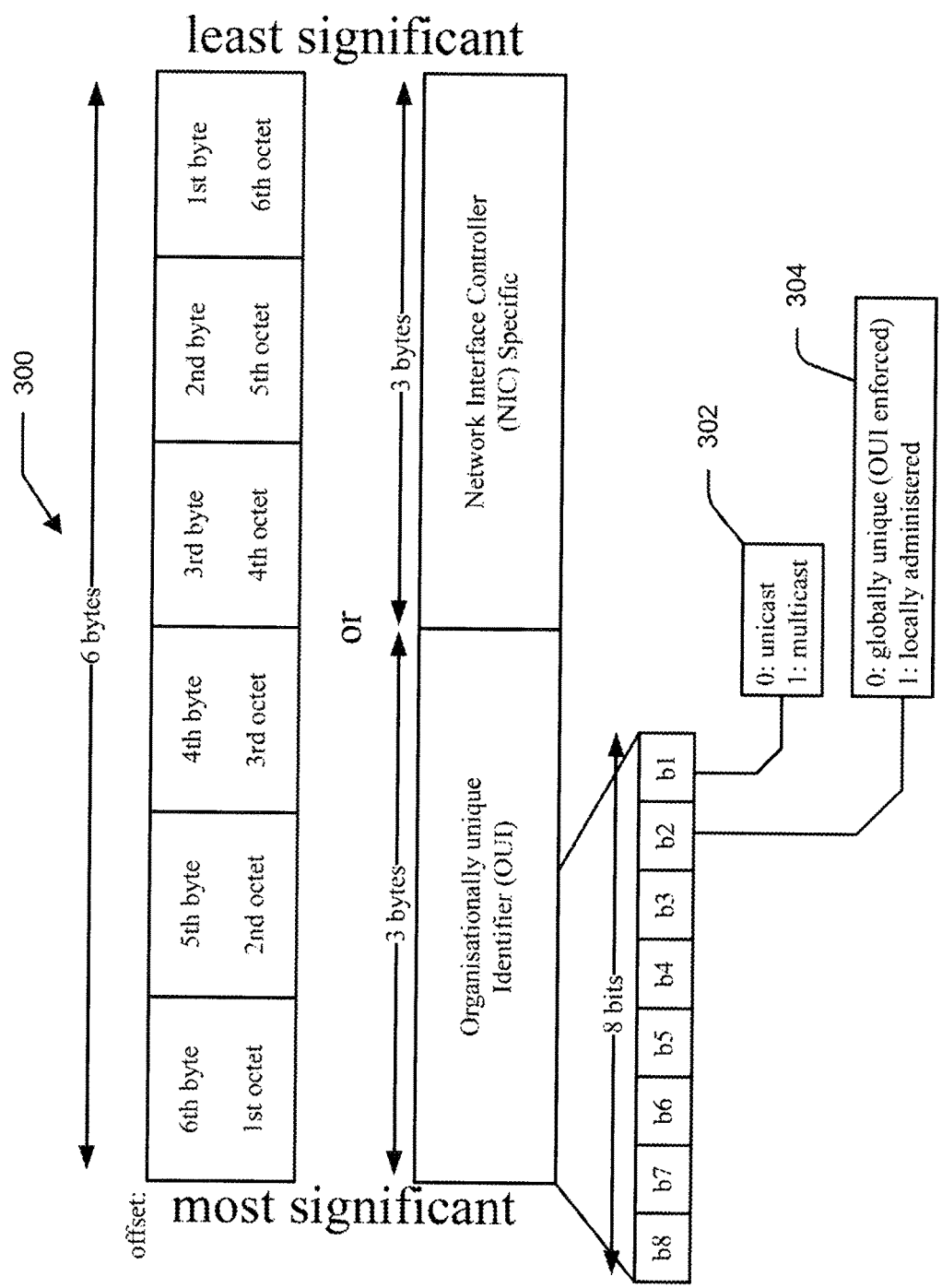
FIG. 3 illustrates Bluetooth address codes implemented in Bluetooth sensors in an embodiment.

Since, all the specified environments included in the protocol definition will have one or more protocol activators or sensors, the system and method of controlling functionality of a mobile device 102 may require a standardization of a specific set of sensors with regard to their identification. Standardization could involve providing a new and useful set of standard address codes. In the example case of Bluetooth devices being deployed as sensors in the specified environment, the MAC addresses of the Bluetooth devices serves as Universal Unique Identification Code (UUID). An exemplary address code system is illustrated in FIG. 3. As shown, the address code 300 contains 6 bytes (a typical MAC address) with the $1^{st}$ byte being the Least Significant Byte and the $6^{th}$ byte being the Most Significant Byte. Bytes 1 to 4 represent issued random binary values to avoid collisions with other Bluetooth devices. Bytes 1-4 are not used by safety protocols. The $5^{th}$ byte represents type of device (or the class of the specified environment) as per the definitions in the safety protocols. For example, bits of the $5^{th}$ byte can correspond to the following device types or specified environments as shown below in Table 2:

TABLE 2

| $5^{th}$ Byte [$b_8$ $b_7$ $b_6$ $b_5$ $b_4$ $b_3$ $b_2$ $b_1$] | Protocol Device Type or Specified Environment |
|---|---|
| 00000001 | Car |
| 00000011 | Classroom |
| 00000101 | Court Room |
| 00001000 | Church |
| 00001011 | Reserved |
| 00000010 | Teen Car |
| 00000100 | Prison |
| 00000111 | Hospital ICU |
| 00001001 | Theatre |
| 00001111 | Parent |

The 8 bits of the most significant byte (or the 6th byte) of the address code 300 can be configured to define modes of transmission and scope of the identifier. For instance, the least significant bit (LSB) $b_1$ of the 6th byte may represent "unicast" transmission if the bit value corresponds to binary 1 and "multicast" transmission if the bit value corresponds to binary 0 as shown in the bit value block 302. Similarly, second bit $b_2$ of the $6^{th}$ byte may represent a "global unique identifier (OUI enforced)" if the bit value corresponds to binary 0 and "locally administered" identifier if the bit value corresponds to binary 1 as shown in the bit value block 304. Bits $b_3$ to $b_8$ represent cellular distraction prevention ID (binary 0 or 1).

In an alternative embodiment, the six-byte long address code (or MAC address) can include a 3-byte long Network Interface Controller (NIC) specific part and a 3-byte long Organizationally Unique Identifier (OUI) part.

In yet another embodiment, there may be a case where an active Bluetooth sensor broadcasts a MAC address and or device name as the trigger signal within the defined parameters of a specified environment. In such case the protocol enabled mobile device automatically responds to such trigger signal based on the device name only thus carrying out the specified protocol instruction. Proper mobile device protocol instruction is carried out with no pairing required.

In yet another embodiment, there may be a case where the one or more sensors 106 in the range have no identifiable MAC address. In such a case, the query module 210 can issue additional requests to obtain device name and or Bluetooth class. The one or more sensors 106 or other devices in the range respond with their corresponding information.

The call authorization module 108 subsequently recognizes the discovery information thus received and implements the safety corresponding protocol behavior. An alternative address code, in such a case, can include 6 bytes as shown in FIG. 3. In this alternative address code, bytes 1 to 4 correspond to issued random binary values to avoid collisions with other devices. The bits of the 5th byte [$b_1$-$b_8$] represent safety protocol device type name (or specified environment) which will be unique for each device type. An exemplary nomenclature corresponding to different bit values is shown below in Table 3 as follows:

TABLE 3

| Device Type Name | Device type (specified Environment) | Unique number |
|---|---|---|
| tsf.car | Car | 9011 |
| tsf.prison | Prison | 9014 |
| tsf.church | Church | 9017 |
| tsf.reserved | Reserved | 9023 |
| tsf.teencar | Teen car | 9012 |
| tsf.court | Court room | 9015 |
| tsf.theatre | Theatre | 9018 |
| tsf.airbag | Accident scene | 9019 |
| tsf.school | School room | 9013 |
| tsf.icu | Hospital ICU | 9016 |
| tsf.parent | Child bedroom | 9020 |
| tsf.child | Child Monitor | 9021 |

The 8 bits of the most significant byte (or the 6th byte) of the address code 300 can be configured to define modes transmission and scope of the identifier. For instance, the least significant bit (LSB) of the 6th byte may represent "unicast" transmission if the bit value corresponds to binary 1 and "multicast" transmission if the bit value corresponds to binary 0 as shown in the bit value block 302. Similarly, second bit of the 6th byte may represent a "global unique identifier (OUI enforced)" if the bit value corresponds to binary 0 and "locally administered" identifier if the bit value corresponds to binary 1 as shown in the bit value block 304. Bits $b_3$ to $b_8$ represent cellular distraction prevention ID (binary 0 or 1). The Bluetooth address codes as illustrated in table 2 and Table 3 can be pre-stored in Bluetooth Address codes 222 in program data 208.

Look Up Table (LUT)

It may be noted that the standard cellular safety protocols can be implemented by using appropriate hardware and software modules, application software, Operating System (OS), and data structures. The exemplary mobile device 102 would have all such functional blocks that would enable the universal implementation of the safety protocols. Since, the proposed protocols are preferred to be implemented universally; the protocols are preferred to be adopted as a device manufacturing standard. In consequence, all mobile devices from all different manufactures are preferred to conform to the standard.

On the other hand, the specified environment, such as, prison, schools, hospitals, transportation vehicles, etc., should have the protocol activators 106 at strategic locations for an effective implementation of the safety protocols. In addition, the protocol activators 106 should be standardized according to the proposed address codes to work in tandem with the mobile device 102.

In an embodiment, the set of safety protocol behavior defined by the safety protocols are represented by means of a look up table (LUT) stored in program data 208 in LUT 220. An exemplary LUT is shown in table 4 below.

TABLE 4

| Line | Hex | DEVICE NAME DEVICE DESIGNATION | ACTION TO BE TAKEN (PROTOCOL BEHAVIOR) |
|---|---|---|---|
| 1 | 01 | VEHICLE 1 | "AND" function of any 2 devices of Line 1 and Line 3 inhibits texting behind the wheel |
| 2 | 02 | VEHICLE 2 | |
| 3 | 03 | VEHICLE 3 | "AND" function of any 2 devices of Line 4 to Line 9 inhibits mobile device |
| 4 | 04 | VEHICLE 4 | |
| 5 | 05 | VEHICLE 5 | |
| 6 | 06 | VEHICLE 6 | |
| 7 | 07 | VEHICLE 7 | |
| 8 | 08 | VEHICLE 8 | |
| 9 | 09 | VEHICLE 9 | |
| 10 | 0A | CLASS ROOM 1 | Inhibit mobile device during class hours if any ID of Line 10 to Line 22 is detected |
| 11 | 0B | CLASS ROOM 2 | |
| 12 | 0C | CLASS ROOM 3 | |
| 13 | 0D | CLASS ROOM 4 | |
| 14 | 0E | CLASS ROOM 5 | |
| 15 | 0F | CLASS ROOM 6 | |
| 16 | 10 | CLASS ROOM 7 | |
| 17 | 11 | CLASS ROOM 8 | |
| 18 | 12 | CLASS ROOM 9 | |
| 19 | 13 | CLASS ROOM 10 | |
| 20 | 14 | PRISON 1 | Disable mobile device if any ID from Line 20 to Line 29 is detected |
| 21 | 15 | PRISON 2 | |
| 22 | 16 | PRISON 3 | |
| 23 | 17 | PRISON 4 | |

TABLE 4-continued

| Line | Hex | DEVICE NAME DEVICE DESIGNATION | ACTION TO BE TAKEN (PROTOCOL BEHAVIOR) |
|---|---|---|---|
| 24 | 18 | PRISON 5 | |
| 25 | 19 | PRISON 6 | |
| 26 | 1A | PRISON 7 | |
| 27 | 1B | PRISON 8 | |
| 28 | 1C | PRISON 9 | |
| 29 | 1D | PRISON 10 | |
| 30 | 1E | COURT 1 | Silence mobile device if any ID from Line 30 to Line 39 is detected |
| 31 | 1F | COURT 2 | |
| 32 | 20 | COURT 3 | |
| 33 | 21 | COURT 4 | |
| 34 | 22 | COURT 5 | |
| 35 | 23 | COURT 6 | |
| 36 | 24 | COURT 7 | |
| 37 | 25 | COURT 8 | |
| 38 | 26 | COURT 9 | |
| 39 | 27 | COURT 10 | |
| 40 | 28 | HOSPITAL 1 | Silence mobile device if any ID from Line 40 to Line 49 is detected |
| 41 | 29 | HOSPITAL 2 | |
| 42 | 2A | HOSPITAL 3 | |
| 43 | 2B | HOSPITAL 4 | |
| 44 | 2C | HOSPITAL 5 | |
| 45 | 2D | HOSPITAL 6 | |
| 46 | 2E | HOSPITAL 7 | |
| 47 | 2F | HOSPITAL 8 | |
| 48 | 30 | HOSPITAL 9 | |
| 49 | 31 | HOSPITAL 10 | |
| 50 | 32 | CHURCH 1 | Silence mobile device during church hours if any ID from Line 50 to Line 59 is detected |
| 51 | 33 | CHURCH 2 | |
| 52 | 34 | CHURCH 3 | |
| 53 | 35 | CHURCH 4 | |
| 54 | 36 | CHURCH 5 | |
| 55 | 37 | CHURCH 6 | |
| 56 | 38 | CHURCH 7 | |
| 57 | 39 | CHURCH 8 | |
| 58 | 3A | CHURCH 9 | |
| 59 | 3B | CHURCH 10 | |
| 60 | 3C | THEATRE 1 | Silence mobile device during show times if any ID from Line 60 to Line 69 is detected |
| 61 | 3D | THEATRE 2 | |
| 62 | 3E | THEATRE 3 | |
| 63 | 3F | THEATRE 4 | |
| 64 | 40 | THEATRE 5 | |
| 65 | 41 | THEATRE 6 | |
| 66 | 42 | THEATRE 7 | |
| 67 | 43 | THEATRE 8 | |
| 68 | 44 | THEATRE 9 | |
| 69 | 45 | THEATRE 10 | |
| 70 | 46 | RESERVED | 46 to FF HEX are reserved for future use |

As shown in the LUT, the device name in HEX is transmitted by the one or more sensors 106 as discovery information. The call authorization module 108 can also instruct the query module 210 to request for device name of the one or more sensors 106 in the specified environment. Upon receipt of the device name, the safety protocol module 212 accesses the LUT 220 (e.g. Table 4) and determines the device designation or the specified environment corresponding to the device name. For instance, a device name "07" in HEX would correspond to a "vehicle 7". The protocol behavior or the action to be taken by the call authorization module 108 correspondingly would be to completely inhibit the mobile device 102. Similarly, device name "28" in HEX would correspond to device designation "Hospital 1" and the corresponding protocol behavior would be to silence the mobile device 102. It may be noted that different device designations correspond to different devices in the same or different specified environment. For instance, device names "14" to "1D" in HEX correspond to different sensors deployed at various locations in a prison. Device name "46" to "FF" in HEX are reserved for future use. The other data 224 includes flag values, variables that are initialized during the process of implementing the standard mobile device distraction prevention and safety protocols.

Self-Powered Bluetooth Sensor

Figure 4:
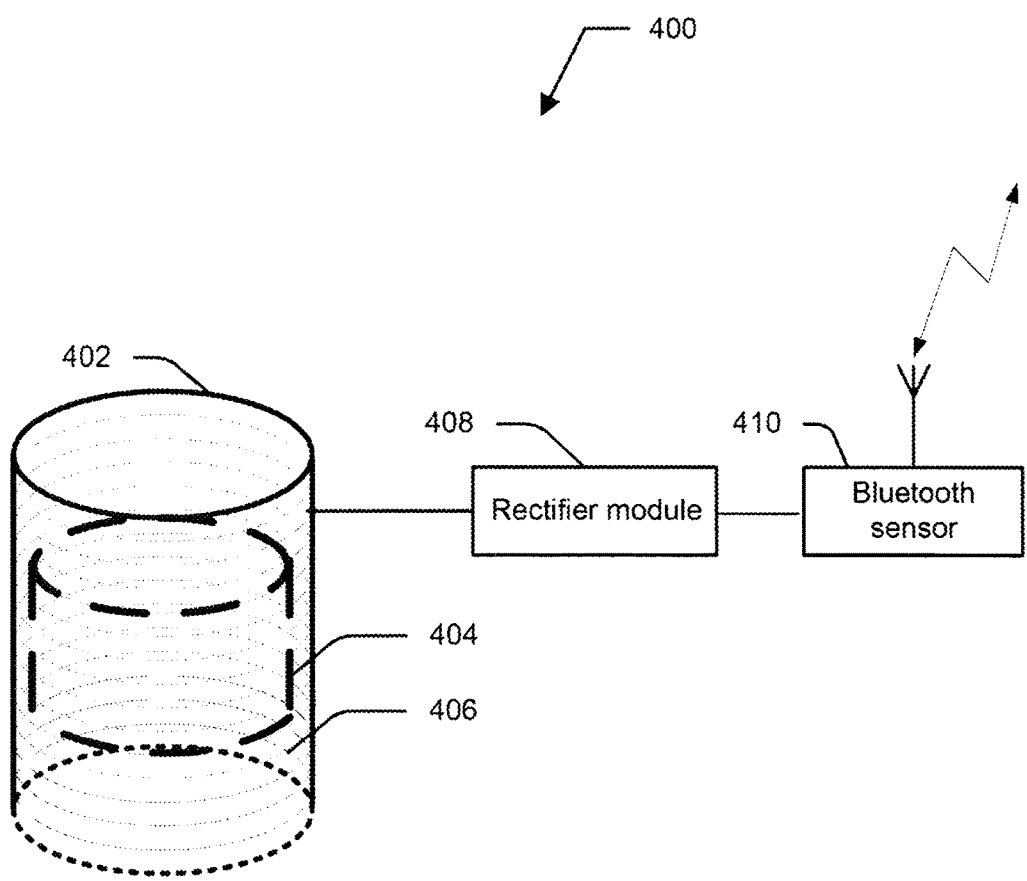
FIG. 4 illustrates a self-powered Bluetooth sensor assembly according to an implementation.

FIG. 4 illustrates the components to be used to create a self-powered Bluetooth sensor 400 according to an implementation. One of the major challenges faced in the implementation of safety protocols and the system 100 is the need to supply power to a Bluetooth sensor(s) which works in tandem with the mobile device 102. In the existing systems, the Bluetooth sensor is powered by direct wiring to a power source or simple replacement batteries which can be time consuming and costly given the universality of the proposed safety protocol. In conventional systems, there exists no simple and cost effective way to power the one or more sensor(s) 106 without having to hard wire or replace batteries. Hence, there is a well felt need for developing a self-powered Bluetooth sensor that does not require hard wiring or battery replacement.

To this end, the exemplary self-powered Bluetooth sensor assembly 400 includes a coil assembly 402. The coil assembly 402 includes a magnet 404 and copper wire winding 406. The magnet 404 is placed coaxially and the copper wire winding 406 is wound in a tubular shape wax paper and becomes impregnated in a plastic cylindrical tube. The self-powered Bluetooth sensor assembly 400 further includes a rectifier module 408 electrically connected to the coil assembly 402. The rectifier module 408 is installed laterally to harness the kinetic energy of all movements via the magnetic core. The rectifier module 408 includes an ultra capacitor and a back-up battery. The rectifier module 408 connects to the Bluetooth sensor 410 that is configured to transmit or receive signals. Such a Bluetooth sensor is capable of powering itself for long periods without requiring hard wire hook up or battery replacement.

When the Bluetooth sensor assembly 400 experiences movement (such as from the motion due to acceleration or deceleration inside a car or the movement caused due to opening or closing of a door or ceiling fan turning, etc.) the magnet 404 slides inside the coil assembly 402 creating a magnetic field. The expanding and collapsing magnetic field creates an AC voltage which is fed to the rectifier module 408 to be rectified and stored in the ultra capacitor. Excessive voltage in the ultra capacitor is used to charge the backup battery. The output of the rectifier module 408 is a DC voltage which is used to power the Bluetooth sensor 410.

Safety Protocol Enforcement:

In an example embodiment, the specified environment can correspond to a transportation vehicle such as, a car. Studies and statistics have shown that numerous accidents take place due to distraction caused by usage of mobile devices while driving. The proposed safety protocols can be configured to prevent the use of a mobile device 102 when the call authorization module 108 senses a driving mode. The manner in which such vehicle safety system functions is disclosed in U.S. Patent Application No. 2010/0087137A1 and is incorporated herein by reference.

For years, research studies have shown that seat belt save lives and prevent damage to life. In addition, many laws have been enacted to require seat belt usage while driving a car. More recently, many studies are coming forth detailing the terrible dangers presented when a driver uses text messaging and email functions on a cell phone during the commute of driving. Many states are passing laws prohibiting such dangerous cell phone usage when operating a vehicle. A major problem with both seat belt laws and cell phone laws is the inherent difficulty of proper enforcement.

There exist no easy definitive means of detection or notification for safety officials and other drivers to be warned when a driver is operating a transportation vehicle or a car in an unsafe or unlawful manner either by not wearing their seatbelt or by using text messaging and email functions on a cell phone when operating the vehicle.

There is, therefore, a need for a simple, cost effective solution to easily alert safety officials and passerby drivers of vehicles whose driver operates a vehicle in an unsafe or unlawful manner.

Figure 5:
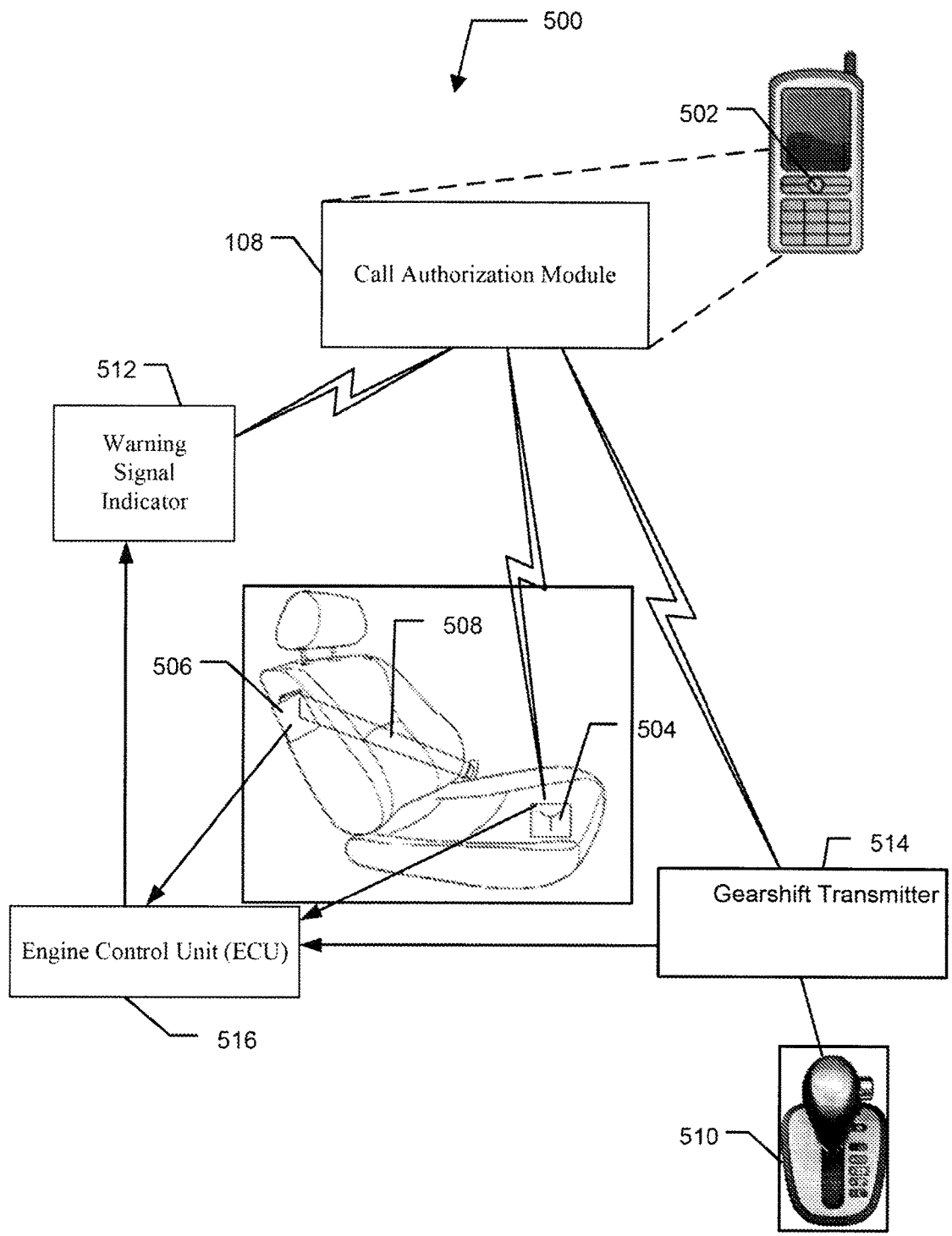
FIG. 5 illustrates a system for enforcement of safety protocols according to an embodiment.

To this end, FIG. 5 illustrates an apparatus for giving a vehicle owner the ability to force mobile device restrictions when allowing others to operate their vehicles. A driver of the vehicle carries a mobile device 502 (an embodiment of mobile device 102) that implements the safety protocols. The mobile device 502 includes the call authorization module 108 and the safety protocols embedded as a part of firmware.

A typical vehicle would have one or more vehicular components that indicate the state of the transportation vehicle. Vehicular components can include a parking brake, a transmission gear, an accelerator, brake, an odometer, a tachometer, a wheel, engine components, and steering wheel or other such components that are capable of undergoing a state or a position change associated with the motion of the vehicle. As would be appreciated by a person skilled in the art, such vehicular components would have an associated change in state or position when the vehicle either starts to move or comes to a complete halt. The change of state or position in the vehicular components is sensed and utilized by the CAM 108 to control the behavior of the mobile device 502 inside of the vehicle. The vehicular components have associated one or more sensors 106 that transmit discovery information, such as, state and/or position information or a trigger signal.

Turning now to the FIG. 5, the system 500 prevents use of mobile device 102 by drivers of vehicles thereby providing greater safety during the driving operation of the vehicle. Accordingly, the system 500 includes the mobile device 502 with CAM 108, and Bluetooth communication technology. The system 500 further includes a driver seat sensor (DSS) 504 with an RFID transponder tag embedded in the driver seat and an RFID tag reader 506 on one of the sides of the driver's seat. The system 500 further includes a circuited seat belt (CSB) assembly 508, a transmission gear shift detection assembly (TA) 510, and warning signal indicator (WSI) 512. The transmission gear shift detection assembly 510 transmits the gearshift position or state via a gearshift transmitter 514. The system 500 may include additional vehicular components such as, owner's compliance key (OCK), ignition, horn, light, radio, etc. that are not shown but may be configured to indicate a state or position that enables the system in determining unsafe and unlawful driving.

The CAM 108 sends and receives signals to and from the one or more vehicular components such as, DSS 504, the transmission gear shift detection assembly 510, the CSB assembly 508, and the WSI 512 to implement the safety protocols inside the vehicle. For instance, the DSS 504 with RFID transponder tag invisibly embedded in the driver's seat area notifies the CAM 108 that the mobile device 502 is in driver's seat area. The transmission gear shift detection assembly 510 includes a series of magnetic switches strategically placed within the confinement of the transmission gear shifting apparatus designed to open or close a magnetic field depending on the gear in which the vehicle operates. In the event of the vehicle being taken out of parking position, the circuit will close immediately sending a notification to the CAM 108.

The CSB assembly 508 includes a circuited seat belt buckle, a seat belt locking tongue, an anti-cheat seat belt harness embedded with an RFID tag and the stationary RFID tag reader 506. The anti-cheat CSB circuit becomes complete (or safe) when the locking buckle and tongue engage in proper locked position and the anti-cheat RFID field is open. The anti-cheat RFID tag embedded in the seat belt harness can be stretched beyond the stationary RFID tag reader 506 creating an open field.

The WSI 512 corresponds to a visible light, a visible antenna, or a notification device to be effectively seen by safety enforcement officials and passerby vehicles.

In operation, when the vehicle driver enters the car, the mobile device 102 with CAM 108 detects the DSS Driver's Seat Sensor 504. Once the driver takes the vehicle transmission out of "park", the transmission gear shift detection assembly 510 sends a notification to the CAM 108. The CAM 108 then sends a signal seeking confirmation that the CSB assembly 508 is properly engaged. In case the CSB assembly 508 is not properly engaged, the WSI 512 is notified which casts a distinct visible signal to alert safety officials and passerby vehicles of non-seat belt driver operation.

The warning signal continues until either the vehicle is placed back into "park" or the anti-cheat CSB 508 becomes fully engaged as described earlier. In case the CSB assembly 508 is fully engaged in the prescribed manner, the CAM 108 continues to poll to determine if the driver is texting or sending and receiving emails. If the driver is engaging in texting or sending and receiving emails, the CAM 108 notifies the WSI 512 which casts yet another distinct visible signal to alert safety officials and passerby vehicles of unsafe or unlawful mobile device usage. The WSI 512 continues its alert status for a determined period after the unsafe or unlawful cell phone activity ceases.

The CAM 108 determines breach of safety rules by referring to the safety protocols embedded in the firmware of the mobile device 502. For example, the safety protocol module 212 includes logic that determines the safety code corresponding to a position of the CSB assembly 508 or the transmission gear shift detection assembly 510. The safety protocol module 212 determines the corresponding warning code which the CAM 108 sends to the WSI 512. An engine control unit (ECU) in the vehicle can be configured to monitor and communicate with the vehicular components and communicate with the CAM 108 to enforce safety protocols.

Figure 6:
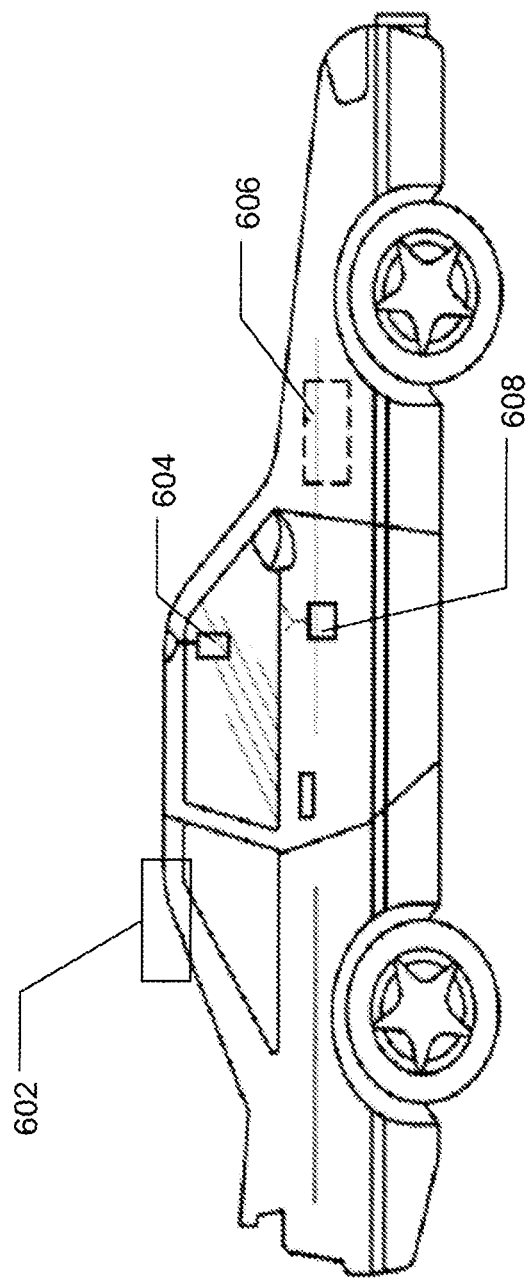
FIG. 6 illustrates location of vehicular components, engine control unit, and mobile device in a vehicle according to an embodiment.

FIG. 6 illustrates the location of vehicular components, engine control unit, and the mobile device 502 in a vehicle according to an embodiment. As shown, the WSI 512 can be at location 602 on the exterior of the vehicle so that safety officials and other passerby vehicles can easily see the warning signals issued by the WSI 512. The WSI 512 can also be deployed at multiple locations so that attention can be easily attracted to an unsafe and unlawful driving of the vehicle. The mobile device 502 would be at location 604 near to the driver seat. The ECU can be at a location 606 on the front side of the vehicular chassis. The transmission gear shift detection assembly 510 can be at a location 608 near the driver's seat.

In an embodiment, the behavior of the mobile device 102 can be controlled based on the position of emergency/parking brake of the transportation vehicle. For example, a car safety apparatus system can be installed in a transportation vehicle. The car safety apparatus system can be installed in line with the emergency braking system. When the vehicle's emergency brake is set, the mobile device in the driver's seat area can be used without any inhibition. As soon as the emergency/parking brake is released, the electronic sensor (e.g. emergency brake sensor) installed will send a trigger signal to the CAM 108 to completely or partially disable the driver's mobile device 102.

Vehicle Occupant Safety System

Figure 7:
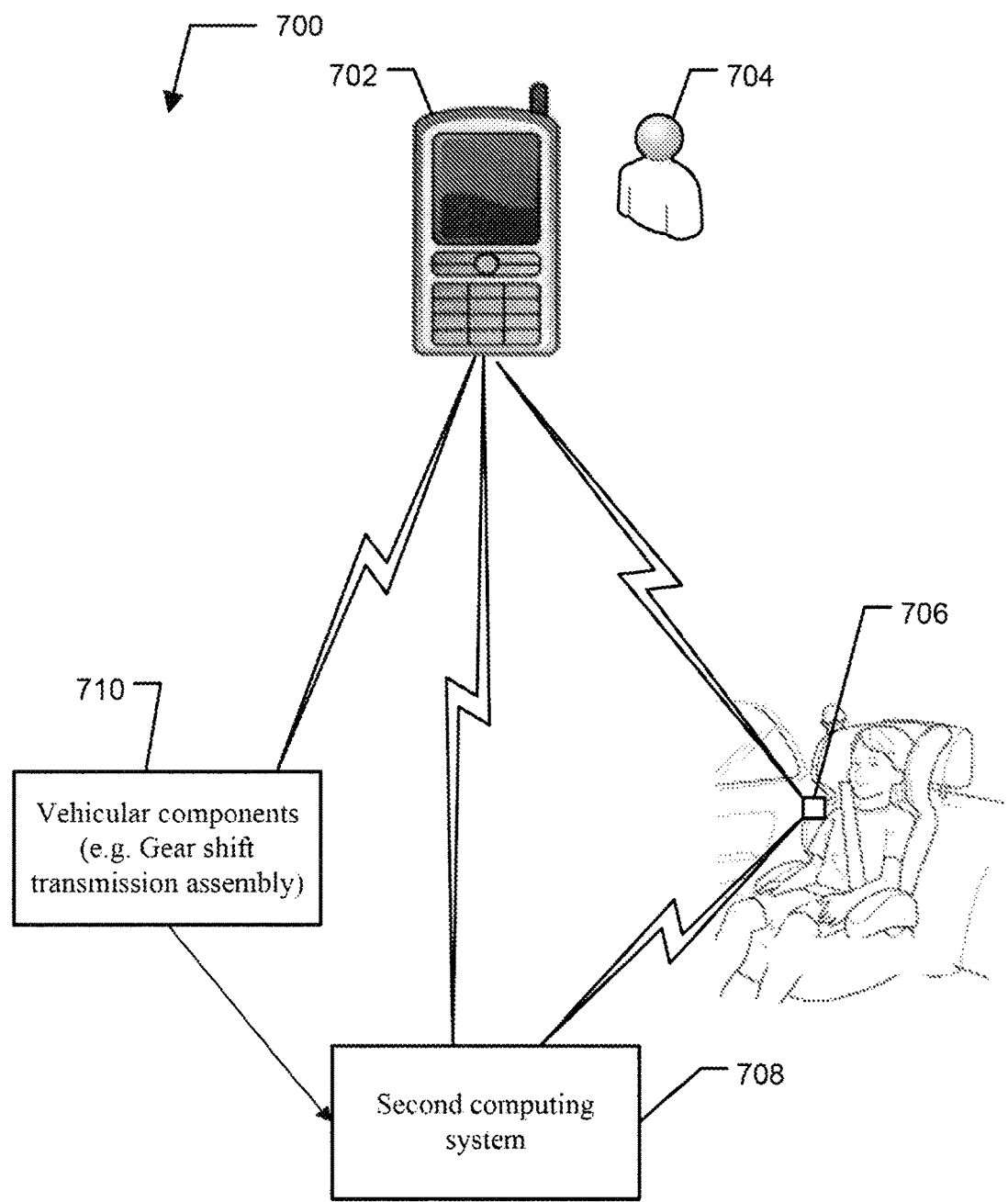
FIG. 7 illustrates a system for ensuring safety of child or vehicle occupant in an embodiment.

FIG. 7 illustrates a system 700 for ensuring safety of a child or a vehicle occupant in an embodiment. Accordingly, the system 700 comprises a mobile device 702 (an embodiment of mobile device 102) carried by a user 704. The mobile device 702 includes a first computing system for signal processing. The user 704 can be a driver of a car or a parent of a child travelling in a transportation vehicle. The system 700 further includes a sensor 706 which may be worn by the child or attached to a pressure activation sensor that is activated by the weight of the child as shown in the figure. In an exemplary embodiment, the sensor 706 can be a Bluetooth sensor emitting discovery information "tsf.child" (part of the protocol, with reference to table 3). The system 700 also includes a second computing system (ECU) 708 in communication with the sensor 706 and one or more vehicular components 710. As described earlier, the vehicular components 710 may correspond to gear shift transmission assembly, parking brake, etc. The vehicular components 710 are configured to give an indication of whether the vehicle is out of parking or is being driven. When the vehicle is in drive mode and a child is in a car, the phone receives the discovery information that includes "tsf.child" signal. The CAM 108 flags and activates the child monitor option as shown in table 3. At the destination when the car engine is shutdown, the driver walks away from the car. If the CAM 108 does not detect "tsf.car" at predetermined time intervals from the child sensor 706, it activates the mobile device 102 to warn the driver that the child is still in the car. When the child is removed from the car, the CAM 108 will time out and reset the child monitor option.

Exemplary Methods

Figure 8:
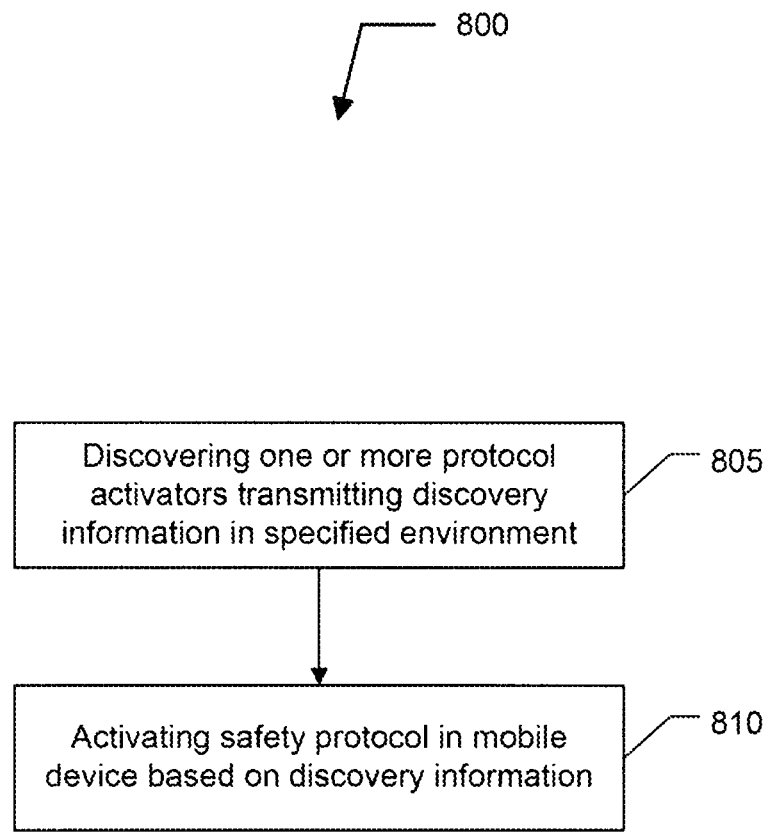
FIG. 8 illustrates a method for activating a safety protocol behavior in mobile device according to an embodiment.

The description of the following methods would be provided with specific references to FIG. 1, FIG. 2, FIG. 3, FIG. 4, FIG. 5, FIG. 6, and FIG. 7 and the corresponding description. FIG. 8 illustrates a method 800 for activating a safety protocol behavior in a mobile device 102 according to an embodiment. The distraction prevention and safety protocol actionable behavior of the mobile device will take effect upon satisfaction of a specific condition. In an embodiment, the specific condition may correspond to entering a specified environment. The specified environment can correspond to a class room, a correctional facility, an airport, an airplane, a court room, a hospital, a church, a theatre, a fly zone, a danger zone, an auditorium, a bedroom, or any other arena or environment where it is desirable to control the behavior of the mobile device 102.

Additionally, satisfaction of a specific condition may correspond to an event inside a transportation vehicle. Such event may include movement of one or more vehicular components that may indicate the state of the transportation vehicle. Vehicular components may include, but not limited to a parking brake, a transmission gear, an accelerator, brake, an odometer, a tachometer, a wheel, engine components, and steering wheel or other such components that are capable of undergoing a state or a position change associated with the motion of the vehicle. As would be appreciated by a person skilled in the art, such vehicular components would have an associated change in state or position when the vehicle either starts to move or comes to a complete halt.

The satisfaction of a specific condition may also correspond to the dialing of a specified sequence of numbers or pressing a specific speed dial. The specific sequence of numbers can be predetermined set of numbers that denote a specific case of criminal emergency. For instance, if a mobile phone receives a threatening call, text, or e-mail, an immediate action can be automatically taken. Immediate action may correspond to sending the contact details (number, e-mail etc. of the sender) to a data bank for potential processing of criminal action. Such an automatic action can be configured as a safety protocol behavior in the mobile phone 102.

Turning to FIG. 8, at block 805, at least one or more protocol activators are discovered. The one or more protocol activators 106 are configured to transmit discovery information associated with the specific condition. In an embodiment, the protocol activators can correspond to pre-standardized Bluetooth sensors characterized by a predetermined device name and or class associated with the specified environment.

In an embodiment, the discovering includes searching for the one or more protocol activators in the specified environment. The CAM 108 instructs the communication module 214 to search for the protocol activators or sensors 106 in the specified environment. In such an implementation, the communication module 214 transmits one or more requests to obtain the discovery information from the one or more protocol activators 106. The discovery information corresponds to device name and or class of the protocol activators 106, the class being informative of the specified environment. The discovery process also includes accessing a look up table (LUT), such as, Table 4, and determining an entry corresponding to the discovery information associated with the specified environment.

At block 810, distraction prevention safety protocol behavior is activated in the mobile device based at least in part on the discovery information. The CAM 108 upon receipt of the discovery information instructs the safety protocol module 212 to determine from the LUT the safety protocol behavior corresponding to the discovery information. In a successive progression, the CAM 108 activates the determined safety protocol behavior in the mobile device 102. In an implementation, activating the safety protocol behavior includes disabling partially or wholly one or more functionalities associated with the mobile device 102. The safety protocol behavior corresponds to one or more of: a partial or complete disabling of the mobile device, disabling text sending functionality, disabling mail sending functionality, disabling calling functionality, enabling a safety protocol enforcement mode, and child safety mode respectively in the mobile device.

In certain cases, it may be desirable to differentiate different working groups and implementing different set of protocol behavior for different working groups. The discovery information may include such information, or the CAM 108 can instruct the RFID reader 230 to gather additional information associated with a specified working group in the specified environment. Thereafter, the safety protocol module 212 determines the protocol behavior corresponding to the specified working group, device name, and class respectively.

In yet another embodiment, the activating includes issuing a warning signal when the discovery information corresponds to an unlawful or unsafe operation in the specified environment. For instance, in the case of a transportation vehicle, the one or more sensors or protocol activators can correspond to various vehicular components that provide state or position information indicating an unlawful or unsafe mode of driving. The driver may ignore the seat belt or may be sending text messages or mails while driving. In such a scenario, the CAM 108 upon detection of unsafe or unlawful mode, issues a warning signal to warning signal indicator (WSI) 512. The WSI 512 then sends out warning signals to be seen by safety enforcement officials and passerby vehicles.

Figure 9:
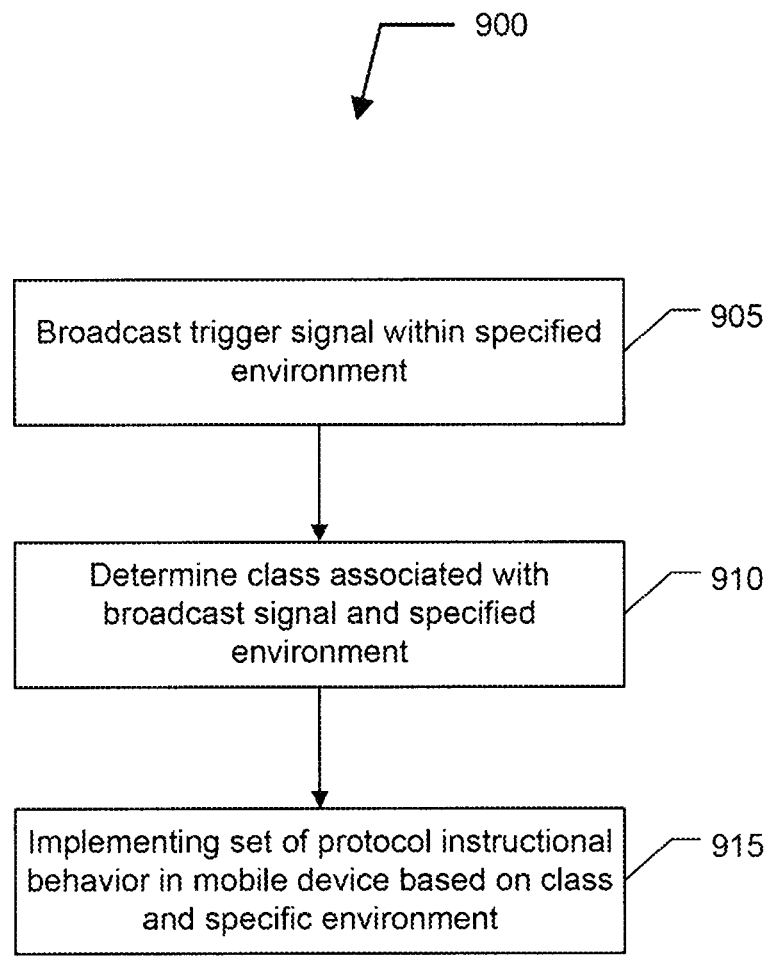
FIG. 9 illustrates a method of controlling functionality of mobile device within specified environment according to an embodiment.

FIG. 9 illustrates a method 900 of controlling functionality of a mobile device within a specified environment. Accordingly, at block 905, a trigger signal is broadcasted within the specified environment. The one more sensors 106 may be activated to send trigger signals by an actuating mechanism that detects the onset of specific conditions. In an implementation, such actuating mechanism may be a tilt switch in case of a transportation vehicle.

At block 910, a class associated with the trigger signal and the specified environment is determined. The CAM 108 determines the class associated with the specified environment and a working group from the trigger signal.

At block 915, a set of protocol instructional behaviors are implemented in the mobile device based at least in part on the determined class and/or the specified environment. The CAM implements the set of protocol instructional behavior corresponding to the trigger signal, the determined class, and working group. In an embodiment, the implementing includes partly or completely disabling the functionality associated with the mobile device 102.

The protocol instructional behaviors permits emergency calls to one or more pre-determined or programmable numbers. For example, in any case of specified environment, the safety protocols allow calls to be made to special numbers during emergency, such as, "911" in United States, "112" in India, etc. Such special numbers can be preprogrammed and included as exceptions to any protocol instructional behavior.

In another example, the safety protocols can allow calls to a special number (parent's number) if the mobile device is carried by a child. The programming of such special numbers may be a feature that is provided by the mobile phone manufacturer or the service provider. The safety protocols can be so configured to accommodate such features.

Figure 10:
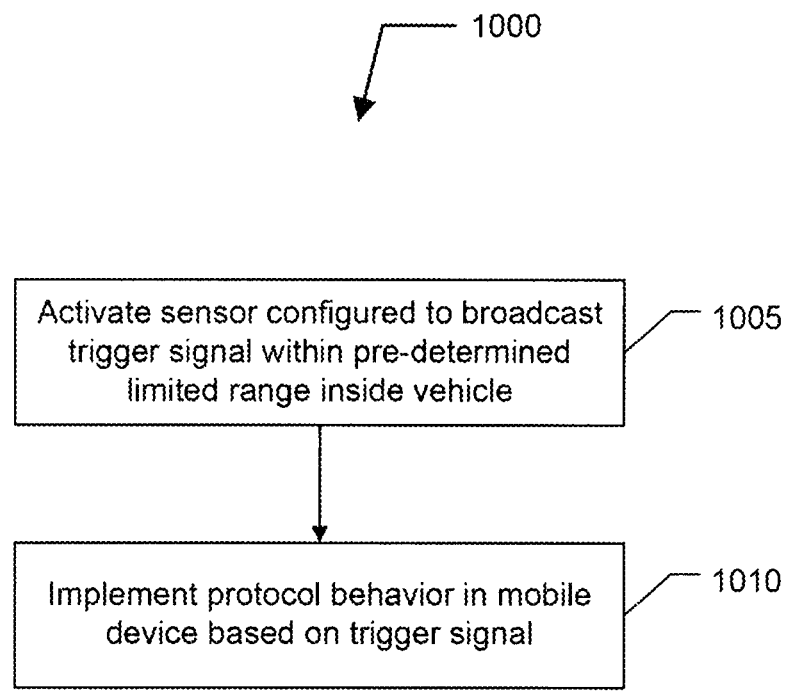
FIG. 10 illustrates a method for controlling behavior of mobile device inside transportation vehicle according to an embodiment.

FIG. 10 illustrates a method 1000 for controlling behavior of a mobile device inside a transportation vehicle in an embodiment. At block 1005, a sensor configured to broadcast a trigger signal within a pre-determined limited range inside the vehicle is activated. In an embodiment, the activation is based at least on a state or a position of one or more vehicular components and/or a tilt switch mechanism configured to determine vehicular movement. The one or more vehicular components include parking brake, transmission gear assembly, accelerator, brake, odometer, tachometer, wheel, seat belt assembly, engine components, and steering wheel.

At block 1010, a protocol behavior based at least in part on the trigger signal is implemented in the mobile device 102. In an embodiment, the CAM 108 implements the protocol behavior in the mobile device 102 inside a predetermined limited range of the sensor 106 only. The protocol behavior implementation includes disabling one or more functionalities associated with the mobile device. Such functionalities include calling, answering a call, emailing, browsing, reading, text messaging, or any other functionalities associated with the mobile device 102.

It will be appreciated that the teachings of the present invention can be implemented as a combination of hardware and software. The software is preferably implemented as an application program comprising a set of program instructions tangibly embodied in a computer readable medium. The application program is capable of being read and executed by hardware such as a computer or processor of suitable architecture. Similarly, it will be appreciated by those skilled in the art that any examples, functional block diagrams and the like represent various exemplary functions, which may be substantially embodied in a computer readable medium executable by a computer or processor, whether or not such computer or processor is explicitly shown. The processor can be a Digital Signal Processor (DSP) or any other processor used conventionally capable of executing the application program or data stored on the computer-readable medium.

The example computer-readable medium can be, but is not limited to, (Random Access Memory) RAM, (Read Only Memory) ROM, (Compact Disk) CD or any magnetic or optical storage disk capable of carrying application program executable by a machine of suitable architecture. It is to be appreciated that computer readable media also includes any form of wired transmission. Further, in another implementation, the method in accordance with the present invention can be incorporated on a hardware medium using ASIC or FPGA technologies.

It is also to be appreciated that the subject matter of the claims are not limited to the various examples and or language used to recite the principle of the invention, and variants can be contemplated for implementing the claims without deviating from the scope. Rather, the embodiments of the invention encompass both structural and functional equivalents thereof.

While certain present preferred embodiments of the invention and certain present preferred methods of practicing the same have been illustrated and described herein, it is to be distinctly understood that the invention is not limited thereto but may be otherwise variously embodied and practiced within the scope of the following claims.

We claim:

1. A protocol activator for activating a protocol behavior in a mobile device within a specified environment, comprising:
    a memory configured to store software instructions; and
    a processor configured to access the software instructions from the memory;
    the processor configured to access the software instructions from the memory to:
        broadcast a trigger signal within the specified environment, the trigger signal comprising discovery information corresponding to a modified universally unique identification (UUID) code of the protocol activator, wherein at least a portion of the modified UUID code identifies at least one of:
            the specified environment in which the protocol activator operates, and
            a specified working group information in the specified environment in which the protocol activator operates; and
        wherein the discovery information broadcast from the protocol activator in the trigger signal causes activation of the protocol behavior in the mobile device within the specified environment.

2. The protocol activator of claim 1, wherein the processor is further configured to execute the software instructions from the memory to further respond to a query for information.

3. The protocol activator of claim 1, wherein the protocol behavior corresponds to at least a partial disablement of functionality of the mobile device.

4. The protocol activator of claim 1, wherein the specified environment corresponds to at least one of a transportation vehicle, a school, a class room, a correctional facility (prison), an airport, an airplane, a court room, a hospital, a church, a theatre, a fly zone, a danger zone, a bedroom, and an auditorium.

5. The protocol activator of claim 1, wherein the protocol activator is further configured to broadcast a second trigger signal in the specified environment.

6. The protocol activator of claim 5, wherein the protocol activator is further configured to broadcast a first trigger signal over a first wireless medium, and broadcast the second trigger signal over a second wireless medium that is different than the first wireless medium.

7. The protocol activator of claim 6, wherein at least one of the first wireless medium and the second wireless medium is acoustic or radio frequency (RF).

8. The protocol activator of claim 6, wherein the protocol activator is further configured to broadcast at least one of the first trigger signal and the second trigger signal over a frequency other than one or more frequencies used within the specified environment for talk and text.

9. The protocol activator of claim 8, wherein the protocol activator is further configured to broadcast at least one of the first trigger signal and the second trigger signal using at least one of Bluetooth, Radio Frequency Identification (RFID), EdOcean, TransferJet, Ultra Wideband (UWB), Wireless USB, DSRC, IrDAa, Wireless Fidelity (WiFi), Zigbee, Near Field Communication (NFC), and Wireless Personal Area Network (WPAN).

10. The protocol activator of claim 1, wherein the discovery information corresponds to a device name, a device class, or a MAC address.

11. A method of activating a protocol behavior in a mobile device within a specified environment comprising:
    broadcasting, by a protocol activator, a trigger signal in the specified environment; and
    including, by the protocol activator, a discovery information in the trigger signal, wherein the discovery information associated with the trigger signal corresponds to a modified universally unique identification (UUID) code of the protocol activator, and wherein at least a portion of the modified UUID code identifies at least one of:
        the specified environment in which the protocol activator operates, and
        a specified working group information in the specified environment in which the protocol activator operates; and
    wherein the discovery information broadcast from the protocol activator in the trigger signal causes activation of the protocol behavior in the mobile device within the specified environment.

12. The method of claim 11, further comprising responding, by the protocol activator, to a query for information.

13. The method of claim 11, wherein the protocol behavior corresponds to at least partial disablement of functionality of the mobile device.

14. The method of claim 11, wherein the discovery information corresponds to a device name, a device class, or a MAC address.

15. The method of claim 11, wherein broadcasting the trigger signal comprises activating the protocol activator based on an actuating mechanism that detects the onset of a specific condition.

16. A method for activating a protocol behavior in a mobile device, comprising:
    discovering, by a processor in the mobile device, a discovery information received in at least one trigger signal from at least one protocol activator, wherein the discovery information corresponds to a modified universally unique identification (UUID) code, wherein at least a portion of the modified UUID code identifies at least one of:
        a specified environment corresponding to the protocol behavior and in which the at least one protocol activator operates, and
        a specified working group information in the specified environment in which the at least one protocol activator operates; and
    activating, by the processor, the protocol behavior in the mobile device based on the discovered discovery information received in the at least one trigger signal received from the at least one protocol activator.

17. The method of claim 16, wherein one or more of the at least one trigger signal is received via Bluetooth or Wi-Fi.

18. The method of claim 16, wherein one or more of the at least one trigger signal is received via satellite.

19. The method of claim 16, wherein the protocol behavior corresponds to at least partial disablement of functionality of the mobile device.

20. The method of claim 16, wherein the modified UUID code corresponds to a device name, a device class, or a MAC address.

\* \* \* \* \*